US008441456B2

(12) United States Patent
Takahashi

(10) Patent No.: US 8,441,456 B2
(45) Date of Patent: May 14, 2013

(54) TOUCH DISPLAY SUBSTRATE AND TOUCH SCREEN DISPLAY APPARATUS HAVING THE SAME

(75) Inventor: Seiki Takahashi, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 238 days.

(21) Appl. No.: 12/845,170

(22) Filed: Jul. 28, 2010

(65) Prior Publication Data

US 2011/0169769 A1    Jul. 14, 2011

(30) Foreign Application Priority Data

Jan. 11, 2010 (KR) .................. 10-2010-0002205

(51) Int. Cl.
*G09G 3/36* (2006.01)
(52) U.S. Cl.
USPC ....................................... 345/173; 345/104
(58) Field of Classification Search ............. 345/104, 345/173, 174, 207; 349/12
See application file for complete search history.

(56) References Cited

U.S. PATENT DOCUMENTS

| 8,115,746 B2* | 2/2012 | Tsai et al. ............... 345/173 |
| 2009/0021683 A1 | 1/2009 | Lee et al. |
| 2009/0167733 A1 | 7/2009 | Lee et al. |
| 2010/0141595 A1* | 6/2010 | Lai et al. ............... 345/173 |
| 2010/0238122 A1* | 9/2010 | Chang et al. ............ 345/173 |

* cited by examiner

*Primary Examiner* — Regina Liang
(74) *Attorney, Agent, or Firm* — H.C. Park & Associates, PLC

(57) ABSTRACT

A touch display substrate comprises a base substrate, a plurality of pixel portions, a sensing element portion and a sensing line portion. The pixel portions can be arranged in at least one pixel column and at least one pixel row on the base substrate, and may include a pixel electrode. The sensing element portion may be disposed in a first column between a first pixel column and a second pixel column, and senses a touch. The sensing line portion may be disposed in a second column between adjacent pixel columns and coupled to the sensing element portion, and the second column is different from the first column. The sensing line portion may be disposed between pixel columns different from the pixel columns where the sensing element portion is disposed so that an aperture ratio of the touch screen display apparatus may be enhanced.

23 Claims, 20 Drawing Sheets

A FIRST DIRECTION

A SECOND DIRECTION

TOUCH DISPLAY SUBSTRATE AND TOUCH SCREEN DISPLAY APPARATUS HAVING THE SAME

CROSS-REFERENCE TO RELATED APPLICATION

This application claims priority to and the benefit of Korean Patent Application No. 2010-2205, filed on Jan. 11, 2010, which is herein incorporated by reference for all purposes as if fully set forth herein.

BACKGROUND OF THE INVENTION

1. Field of the Invention

Example embodiments of the present invention relate to a touch display substrate, more particularly, to a touch display substrate for a liquid crystal display apparatus and a touch screen display apparatus having a touch display substrate.

2. Description of the Related Art

Generally, a liquid crystal display (LCD) apparatus has been adopted as one of the most widely used typed of display applications such as monitors, laptops, and cellular phones due to several advantages, for example, slim thicknesses, light weights and low power consumptions. The LCD apparatus may include an LCD panel for displaying an image using light transmittance of a liquid crystal, and a backlight assembly disposed under the LCD panel for providing light to the LCD panel.

For example, the LCD panel may include a signal line, an array substrate including a thin-film transistor (TFT) and a pixel electrode, an opposite substrate facing the array substrate and the LCD panel may further include a color filter and a common electrode, and a liquid crystal layer disposed between the array substrate and the opposite substrate.

A touch electrode and a sensing line may be integrated on the LCD panel so that a touch screen display panel can detect a position signal using an external pressure. If the external pressure is applied to the touch screen display panel by an object such as a pen and a human finger the position signal corresponding to a touch position can be generated via the touch electrode, and the position signal can be readout through the sensing line. For example, the position signal may be generated if a capacitance between the common electrode and the touch electrode is changed by the external pressure or if the common electrode contacts with the touch electrode. Therefore, there is a need for an approach to enhance an aperture ratio.

SUMMARY OF THE INVENTION

Exemplary embodiments of the present invention provide a touch display substrate capable of enhancing an aperture ratio.

Exemplary embodiments of the present invention provide a touch screen display apparatus having a touch display substrate.

Additional features of the invention will be set forth in the description which follows, and in part will be apparent from the description, or may be learned by practice of the invention.

Exemplary embodiments of the present invention disclose a substrate. The substrate includes a plurality of pixels, comprising a plurality of pixel electrodes, arranged in column directions and row directions on the substrate. The substrate also includes a sensing element disposed in a first column arranged between a first pixel column and a second pixel column to detect a touch event. The substrate includes a sensing line disposed in a second column arranged between pixel columns to be coupled with the sensing element, the second column being different from the first column.

Exemplary embodiments of the present invention disclose an apparatus. The apparatus includes a touch display substrate including a first substrate, a plurality of pixels arranged in pixel column directions and pixel row directions based on the substrate. The apparatus also includes a pixel electrode, a sensing element disposed in a first column arranged between a first pixel column and a second pixel column to detect a touch signal. The apparatus includes a sensing line disposed in a second column arranged between the first pixel column and the second pixel column and the sensing line is coupled to the sensing element. The apparatus further includes a second substrate which faces the first substrate. The apparatus includes a liquid crystal layer disposed between the first substrate and the second substrate. The apparatus further includes a readout part which is coupled to sensing lines of the sensing line to receive the touch signal, and to output a readout signal in response to the touch signal.

Exemplary embodiments of the present invention disclose a method. The method includes disposing a sensing portion comprising a sensing element and a sensing line, the sensing line coupled to the sensing element, wherein the sensing line is disposed between pixel columns which are different from the pixel columns between which the sensing element is disposed, wherein a plurality of pixels comprising pixel electrodes are arranged in column directions and row directions on a substrate.

Exemplary embodiments of the present invention disclose a display capable of detecting a touch event. The display includes a plurality of pixels are arranged in column directions and row directions on a substrate. A sensing portion includes a sensing element and a sensing line and the sensing line is disposed between pixel columns which are different from the pixel columns between which the sensing element is disposed. The sensing line is coupled to the sensing element.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
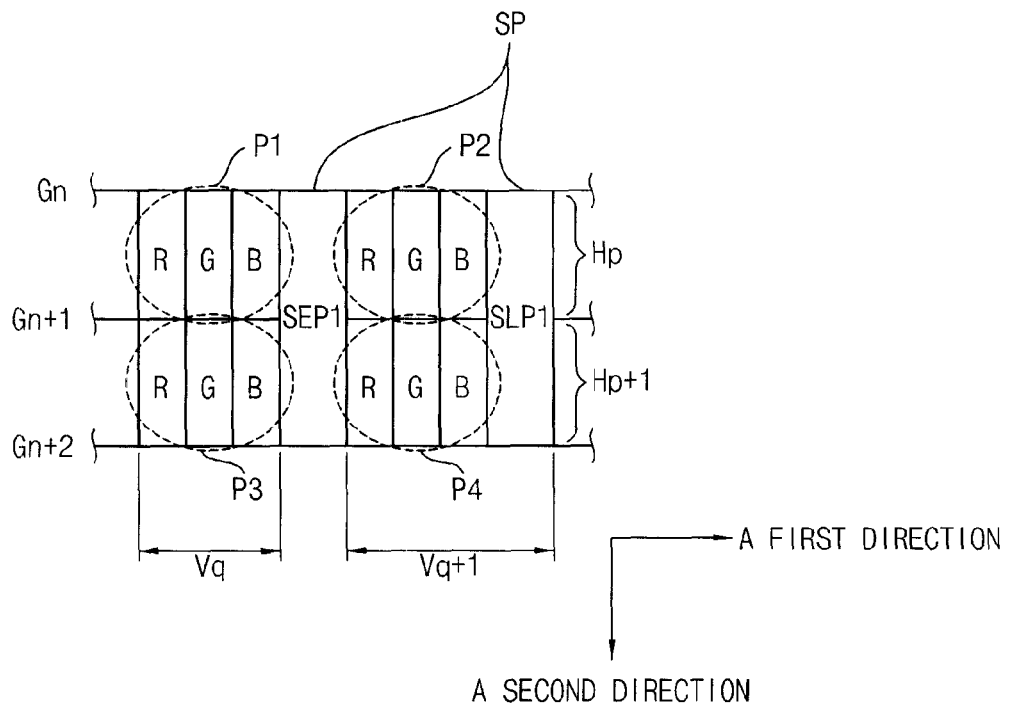
FIG. 1 is a plan view illustrating a touch screen display apparatus according to exemplary embodiments of the present invention.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these embodiments are provided so that this disclosure is thorough and complete, and will fully convey the scope of the present invention to those skilled in the art. In the drawings, the sizes and relative sizes of layers and regions may be exaggerated for clarity.

It is understood that when an element or layer is referred to as being "on," "connected to," or "coupled to" another element or layer, it can be directly on, connected or coupled to the other element or layer or intervening elements or layers may be present. In contrast, when an element is referred to as being "directly on," "directly connected to," or "directly coupled to" another element or layer, there may be no intervening elements or layers present. Like numerals refer to like elements throughout. As used herein, the term "and/or" includes any and all combinations of one or more of the associated listed items.

It is understood that, although the terms using numerical terms such as 'first,' 'second,' and 'third' they may be used herein to describe various elements, components, regions, layers and/or sections, these elements, components, regions, layers and/or sections should not be limited by these numerical terms. These terms are merely used to distinguish one element, component, region, layer or section from another region, layer or section. Thus, an element, a component, a region, a layer or a section designated as "first" discussed below could be termed an element, a component, a region, a layer or a section designated as "second" without departing from the teachings of the present invention.

Spatially relative terms, such as "beneath," "below," "lower," "above," "upper" and the like, may be used herein for illustration of elements or spatial relationship with respect to one element(s) or feature(s) to another element(s) or feature(s) as illustrated in the figures. It is understood that the spatially relative terms can encompass different orientations of the apparatus in use or operation in addition to the orientation depicted in the figures. For example, if the apparatus in the figures is turned over, elements described as "below" or "beneath" other elements or features would then be oriented "above" the other elements or features. Thus, the exemplary term "below" can encompass both orientations of above and below. The apparatus may be otherwise oriented (rotated 90 degrees or at other orientations) and the spatially relative terms used herein may be interpreted accordingly.

It is also understood that terminology used herein is for the purpose of describing exemplary embodiments is not intended to limit a scope of the present invention. As used herein, the singular forms "a," "an" and "the" may include the plural forms as well unless the context clearly indicates otherwise. It is further understood that the terms "comprises" and/or "comprising," when used in this specification, specify features, integers, steps, operations, elements, and/or components, but may not be interpreted to preclude an addition of one or more other features, integers, steps, operations, elements, components, and/or groups thereof.

Exemplary embodiments of the invention may be described herein with reference to cross-sectional illustrations that are schematic illustrations of exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to particular shapes of regions illustrated herein but are to include deviations in shapes that can be resulted, for example, from manufacturing process by way of configurations. For example, an implanted region illustrated as a rectangle, typically, has rounded or curved features and/or a gradient of implant concentration at its edges rather than a binary change from implanted to non-implanted region. Likewise, a buried region formed by an implantation may result in a region between the buried region and the surface through which the implantation takes place. Thus, the regions illustrated in the figures may be schematic in nature and their shapes may not be intended to illustrate an actual shape of a region of an apparatus and may not intended to limit the scope of the present invention.

Unless otherwise defined, all terms (including technical and scientific terms) used herein may have the same meaning as commonly understood by one of ordinary skill in the art to which this invention belongs. It is further understood that terms, such as those defined in commonly used dictionaries, may be interpreted as having a meaning that is consistent with their meaning in the context of the relevant art and may not be interpreted in an abstract way or unduly formal sense unless expressly so defined herein.

Hereinafter, the present invention is described in detail with reference to the accompanying drawings.

Figure 2:
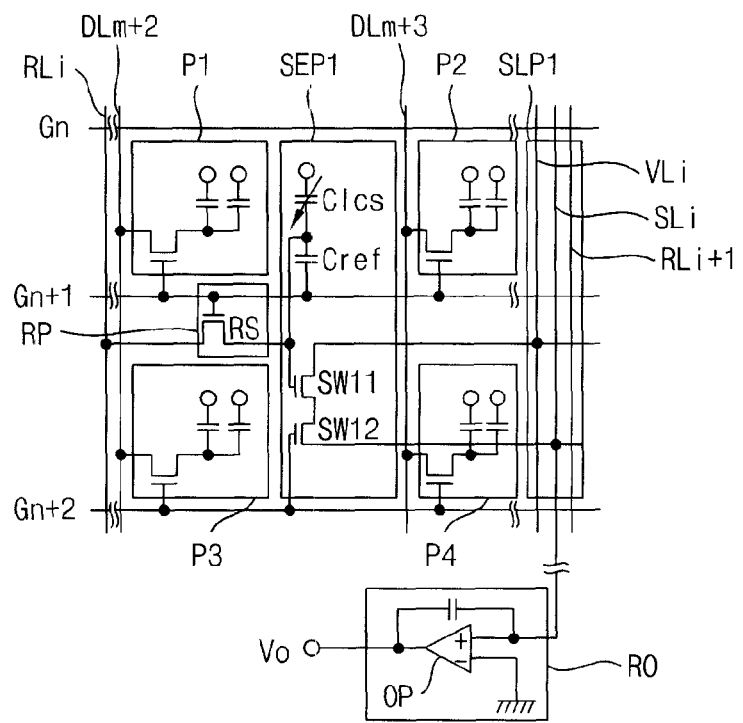
FIG. 2 is a circuit diagram illustrating a pixel portion and a sensing portion of the touch screen display apparatus of FIG. 1.

FIG. 1 is a plan view illustrating a touch screen display apparatus according to exemplary embodiments of the present invention. FIG. 2 is a circuit diagram illustrating a pixel portion and a sensing portion of the touch screen display apparatus of FIG. 1.

Referring to FIG. 1 and FIG. 2, the touch screen display apparatus may include a plurality of pixel portions for displaying an image, a plurality of sensing portions SP for detecting a touch and a readout part RO.

The pixel portions may have a matrix structure, and each of the pixel portions may include a plurality of color pixels. For example, the pixel portion may include a red pixel R, a green pixel G and a blue pixel B which are disposed adjacent to each other in a first direction. For example, the first direction may be a horizontal direction. A first pixel portion P1, a second pixel portion P2, a third pixel portion P3 and a fourth pixel portion P4 are illustrated in FIG. 1.

A plurality of pixel portions may include a plurality of horizontal lines Hp and Hp+1, and a plurality of vertical lines Vq and Vq+1. The vertical lines Vq and Vq+1 may be arranged in a first direction, and each of the vertical lines Vq and Vq+1 may extend in a second direction substantially perpendicular to the first direction. The horizontal lines Hp and Hp+1 may be arranged in the second direction, and each of the horizontal lines Hp and Hp+1 may extend in the first direction. For example, a p-th horizontal line Hp may include pixel portions electrically connected to an (n+1)-th gate line Gn+1, and a (p+1)-th horizontal line may include pixel portions electrically connected to an (n+2)-th gate line Gn+2. Here, p and q are natural numbers.

Each of the horizontal lines Hp and Hp+1 may include two pixel portions, and each of the vertical lines Vq and Vq+1 may include two pixel portions.

Each pixel portion may include a driving element TR, and a liquid crystal capacitor CLC and a storage capacitor CST coupled to the driving element TR.

The sensing portions SP may respectively be disposed between a plurality of vertical lines.

As illustrated in FIG. 1 and FIG. 2, the sensing portion SP may include a sensing element portion SEP1 for detecting a touch event and a sensing line portion SLP1 including an input/output (I/O) line of the sensing element portion SEP1.

The sensing element portion SEP1 may be disposed in a first column between the first pixel portion P1 and the second pixel portion P2 and between the third pixel portion P3 and the fourth pixel portion P4.

The sensing line portion SLP1 may be disposed in a second column adjacent to the second pixel portion P2 and the fourth pixel portion P4.

For example, the sensing element portion SEP1 and the sensing line portion SLP1 may be disposed to have a length corresponding to two horizontal lines Hp and Hp+1, and may alternately be disposed between adjacent vertical lines Vq and Vq+1. The sensing portion SP can be driven and reset in response to a high level gate signal applied to the (n+1)-th gate line Gn+1. Here, n is a natural number.

As illustrated in FIG. 2, the sensing element portion SEP1 may include a reference capacitor Cref, a sensing capacitor Clcs, a first switching element SW11 and a second switching element SW12.

The sensing line portion SLP1 may include an i-th voltage line VLi, an i-th sensing line SLi and an (i+1)-th reset line RLi+1 which are adjacent to each other. Here, i is a natural number.

The reference capacitor Cref may include a first electrode coupled to the (n+1)-th gate line Gn+1 and a second electrode coupled to the sensing capacitor Clcs. The sensing capacitor Clcs may include a touch electrode coupled to the second electrode of the reference capacitor Cref and a common electrode receiving a common voltage Vcom.

The first switching element SW11 may include an input electrode coupled to the i-th voltage line VLi receiving a power signal Vdd, a control electrode coupled to the reference capacitor Cref and the sensing capacitor Clcs, and an output electrode coupled to the second switching element SW12. For example, the power signal Vdd may be about 15 V.

The second switching element SW12 may include an input electrode coupled to the first switching element SW11, a control electrode coupled to an (n+2)-th gate line Gn+2 and an output electrode for outputting a sensing signal.

In this example, an output electrode of the second switching element SW12 may be coupled to an i-th sensing line SLi. For example, the i-th sensing line SLi may receive a voltage of about 5 V.

A reset portion RP may be disposed between the pixel portions P along the second direction, and the reset portion RP may further include a reset element RS.

The reset element RS may include a control electrode coupled to the (n+1)-th gate line Gn+1, an input electrode coupled to an i-th reset line RLi for receiving the reset signal Vreset and an output electrode coupled to the control electrode of the first switching element SW11.

Hereinafter, a process of driving the sensing portion SP is described.

If a high level gate signal is applied to the (n+1)-th gate line Gn+1, a node voltage Vn is generated at a connection node between the reference capacitor Cref and the sensing capacitor Clcs. In this example, the node voltage Vn can be generated based on the reset signal Vreset.

The first switching element SW11 may output the power signal Vdd to the second switching element SW12 according to the node voltage Vn. If the high level gate signal is applied to the (n+2)-th gate line Gn+2, the second switching element SW12 outputs the power signal Vdd transmitted via the first switching element SW11.

If a touch event is generated in the sensing capacitor Clcs, a value of the sensing capacitor Clcs is changed, and the node voltage Vn is changed. If the high level gate signal is applied to the (n+1)-th gate line Gn+1, the node voltage Vn is reset by the reset signal Vreset. Therefore, the value of the sensing capacitor Clcs may be changed if a low level gate signal is applied to the (n+1)-th gate line Gn+1. The reset signal Vreset may have a threshold voltage. For example, the reset signal Vreset may be about 24 V.

Therefore, the power signal Vdd outputted from the first switching element SW11 can be changed in response to the changed node voltage Vn.

For example, the second switching element SW12 may output a sensing signal corresponding to the changed node voltage Vn to the j-th sensing line SLj if a high level gate signal is applied to the (n+2)-th gate line Gn+2.

The better the characteristics of the first switching element SW11, the higher sensitivity of the sensing signal can be outputted from the first switching element SW11. The characteristics of the first switching element SW11 may be proportional to a drain electric current with respect to a gate voltage. The drain electric current can increase in proportion to a width-to-length (W/L) ratio of a channel. Accordingly, the larger the size of the first switching element SW11 i.e., the larger the W/L ratio, the higher the sensitivity of the sensing signal.

In addition, the larger a fluctuation of the node voltage Vn, the higher the sensitivity of the sensing signal. The node voltage Vn may be defined as Equation 1. Equation 1:

$$Vn = Vreset - ((Vg^+) - (Vg^-)) \times \frac{Cref}{(Cref + Clc + Cgd + Cgs)}$$

In Equation 1, for example, Vg+ is a high voltage of a gate signal, Vg− is a low voltage of a gate signal, Cgd is a parasitic capacitance between a gate electrode and a drain electrode of the first switching element SW11, and Cgs is a parasitic capacitance between the gate electrode and a source electrode of the first switching element SW11.

Referring to Equation 1, the node voltage Vn may be proportional to the parasitic capacitances Cgd and Cgs of the first switching element SW11, and the node voltage Vn may inversely be proportional to the reference capacitor Cref. Thus, as an area of the sensing portion increases, the sensing capacitor Clc and the reference capacitor Cref in the sensing portion can be formed with increased sizes so that the fluctuation of the node voltage Vn may be increased. If the fluctuation of the node voltage Vn increases, the fluctuation of the sensing signal generated in response to the node voltage Vn increases so that sensing characteristics of the sensing portion may be improved.

Thus, as a ratio of a channel width W to a channel length L of the first switching element SW11 increases and a capacitance of the reference capacitor Cref and the sensing capacitor Clc increases, thereby sensing characteristics may be enhanced.

The readout part RO may include a plurality of amplifiers. For example, sensing signals provided from the sensing lines can be input to each of the amplifiers OP. The amplifiers OP can be coupled to the sensing lines outputting a sensing signal of sensing portions SP. The sensing portions SP having reset elements RS coupled to the gate lines which may be disposed differently from each other.

For example, the amplifiers OP can output a readout signal Vo in response to a sensing signal transmitted through sensing line SLi if a high level signal is applied to the (n+2)-th gate line during a horizontal period 1H. Although not shown in the figure, the amplifiers OP can output a readout signal Vo in response to a sensing signal transmitted through a sensing line (not illustrated) if a high level signal is applied to the (n+4)-th gate line during the horizontal period 1H. Accordingly, the amplifier OP can output the readout signal Vo with the period of 1H.

Figure 3:
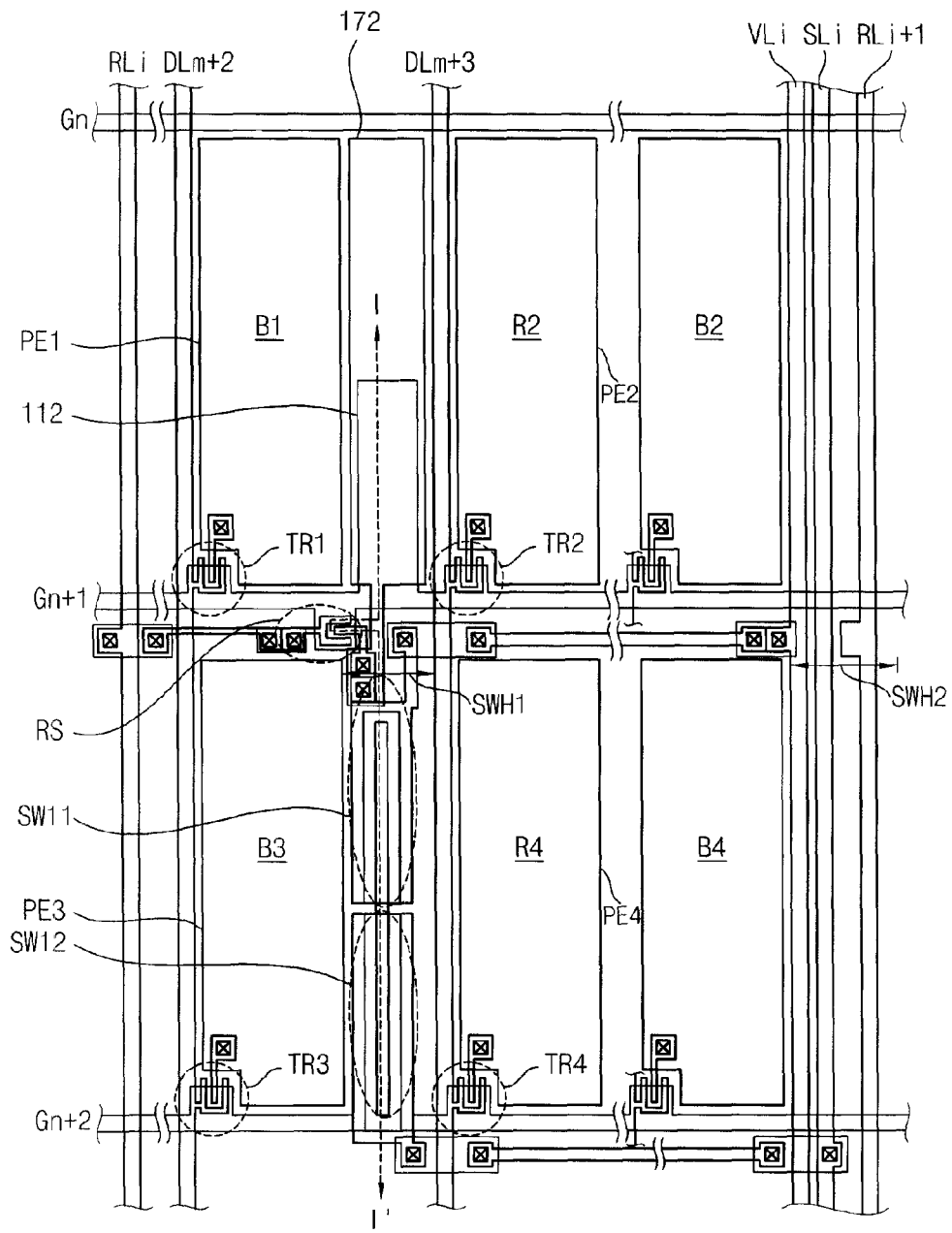
FIG. 3 is a plan view illustrating a connection between a sensing element portion and a sensing line portion of FIG. 1.
Figure 4:
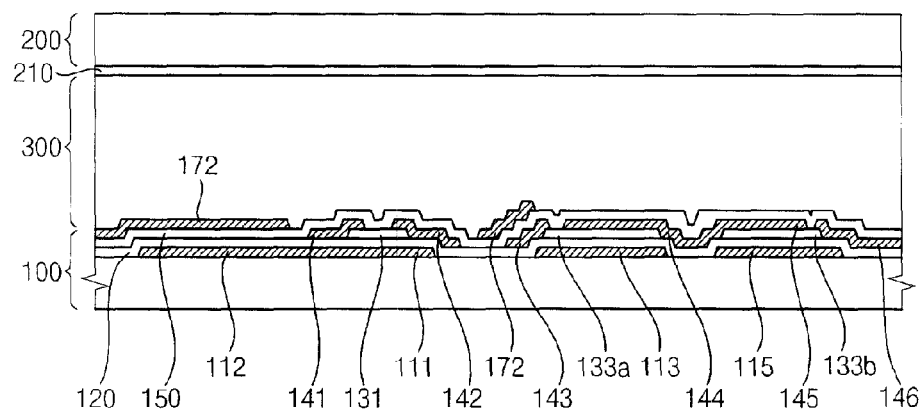
FIG. 4 is a cross-sectional view taken along a line I-I' of FIG. 3.

FIG. 3 is a plan view illustrating a connection between a sensing element portion and a sensing line portion of FIG. 1. FIG. 4 is a cross-sectional view taken along a line I-I' of FIG. 3.

Referring to FIG. 1, FIG. 3 and FIG. 4, the touch screen display apparatus may include a touch display substrate 100, an opposite substrate 200 and a liquid crystal layer 300.

The touch display substrate 100 may include a plurality of gate lines Gn, Gn+1 and Gn+2, a plurality of data lines DLm+2 and DLm+3, a plurality of voltage lines VLj, a plurality of reset lines RLj and a plurality of sensing lines SLj.

The gate lines Gn, Gn+1 and Gn+2 may extend in a first direction. The data lines DLm+2 and DLm+3, the voltage lines VLj, the reset lines RLj and the sensing lines SLj may extend in a second direction.

For example, a blue pixel B1 of the first pixel portion P1 may include a first driving element TR1 coupled to the (n+1)-th gate line Gn+1 and the (m+2)-th data line DLm+2, and a first pixel electrode PE1 coupled to the first driving element TR1. If the first driving element TR1 is turned on, the first pixel electrode PE1 receives a pixel voltage. The blue pixel B1 may include an LCD capacitor defined by the first pixel electrode PE1, the liquid crystal layer 300 and a common electrode 210 of the opposite substrate 200. The LCD capacitor can control an arrangement of liquid crystal molecules using an electric field generated by the first pixel electrode PE1 and the common electrode 210, and can display a blue color grayscale of an image.

A red pixel R2 of the second pixel portion P2 may include a second driving element TR2 coupled to the (n+1)-th gate line Gn+1 and the (m+3)-th data line DLm+3, and a second pixel electrode PE2 coupled to the second driving element TR2. The red pixel R2 may include an LCD capacitor defined by the second pixel electrode PE2, the liquid crystal layer 300 and the common electrode 210 of the opposite substrate 200.

A blue pixel B3 of the third pixel portion P3 may include a third driving element TR3 coupled to the (n+2)-th gate line Gn+2 and the (m+2)-th data line DLm+2, and a third pixel electrode PE3 coupled to the third driving element TR3. The blue pixel B3 may include an LCD capacitor defined by the third pixel electrode PE3, the liquid crystal layer 300 and the common electrode 210 of the opposite substrate 200.

A red pixel R4 of the fourth pixel portion P4 may include a fourth driving element TR4 coupled to the (n+2)-th gate line Gn+2 and the (m+3)-th data line DLm+3, and a fourth pixel electrode PE4 coupled to the fourth driving element TR4. The red pixel R4 may include an LCD capacitor defined by the fourth pixel electrode PE4, the liquid crystal layer 300 and the common electrode 210 of the opposite substrate 200.

The reference capacitor Cref and the sensing capacitor Clcs of the sensing element portion SEP1 may be disposed between the blue pixel B1 of the first pixel portion P1 and the red pixel R2 of the second pixel portion P2.

A first switching element SW11 and a second switching element SW12 of the sensing element portion SEP1 may be disposed between the blue pixel B3 of the third pixel portion P3 and the red pixel R4 of the fourth pixel portion P4.

The I/O line portion SLP1 may be formed adjacent to a blue pixel B2 of the second pixel portion P2 and a blue pixel B4 of the fourth pixel portion P4. The sensing line portion SLP1 may include the i-th voltage line VLi, the i-th sensing line SLi and the (i+1)-th reset line RLi+1 which are formed adjacent to each other.

The sensing element portion SEP1 may include a reference capacitor Cref and a sensing capacitor Clcs. A first electrode 112 of the reference capacitor Cref can be protruded from the (n+1)-th gate line Gn+1 and may be disposed in the sensing element portion SEP1. A second electrode of the reference capacitor Cref may include a material substantially the same as the first pixel electrode PE1, and may be defined by a transparent electrode 172 overlapping with the first electrode 112. The reference capacitor Cref may be defined by the first electrode 112 and the transparent second electrode 172 overlapping with each other, and insulating layers 120 and 150 interposed between the first electrode 112 and the transparent second electrode 172.

A touch electrode of the sensing capacitor Clcs may be defined by the transparent second electrode 172 which does not overlap with the first electrode 112 of the reference capacitor Cref. The sensing capacitor Clcs may be defined by the touch electrode, the liquid crystal layer 300, and the common electrode 210 formed on the opposite substrate 200.

The reset element RS may include a reset control electrode 111 coupled to the (n+1)-th gate line Gn+1, an reset input electrode 141 coupled to the i-th reset line RLi and an reset output electrode 142 spaced apart from the reset input electrode 141. In addition, the reset element RS may include a semiconductor layer 131 disposed on the reset control electrode 111. The reset element RS may be coupled to the i-th reset line RLi via a contact portion and a transparent electrode which are disposed between the (n+1)-th gate line Gn+1 and a horizontal line Hp+1. Therefore, an aperture ratio of the touch display substrate in the first direction may be increased so that a total aperture ratio of the touch screen display apparatus may be enhanced.

The first switching element SW11 may include a first control electrode 113 coupled to the reset output electrode 142 of the reset element RS, a first input electrode 143 coupled to the i-th voltage line VLi and a first output electrode 144 coupled to the second switching element SW12 formed under the first switching element SW11. The first switching element SW11 may be coupled to the i-th voltage line VLi via the contact portion and the transparent electrode which are disposed between the (n+1)-th gate line Gn+1 and the horizontal line Hp+1. Therefore, an aperture ratio of the touch display substrate in the first direction may be increased so that a total aperture ratio of the touch screen display apparatus may be enhanced.

The second switching element SW12 may include a second control electrode 115 coupled to the (n+2)-th gate line Gn+2, a second input electrode 145 coupled to the first output electrode 144 of the first switching element SW11, and a second output electrode 146 coupled to the i-th sensing line SLi. The first switching element SW11 may be coupled to the i-th sensing line SLi via a contact portion and a transparent electrode which are disposed under the (n+2)-th gate line Gn+2. Therefore, an aperture ratio of the touch display substrate in the first direction may be increased so that a total aperture ratio of the touch screen display apparatus may be enhanced.

The first switching element SW11 and the second switching element SW12 may further include semiconductor layers 133a and 133b respectively disposed on the first control electrode 113 and the second control electrode 115.

A width SWH1 of the sensing element portion SEP1 with respect to the aperture ratio of the touch screen display apparatus can be related to a width of the first switching element SW11 or a width of the second switching element SW12. For example, the first switching element SW11 and the second switching element SW12 can be arranged in the second direction and each may have the same widths.

The width SWH1 of the sensing element portion SEP1 in the first direction may be a sum of a first circuit distance, a second circuit distance, a third circuit distance, a fourth circuit distance and a fifth circuit distance.

The second circuit distance may be a width of the contact portion. The fourth circuit distance may be an extended line of the input electrode 141 of the first switching element SW11. The first circuit distance, the third circuit distance and the fifth circuit distance may be areas between metal patterns, and the metal pattern may not be formed in the areas.

For example, the minimum values of the first circuit distance, the second circuit distance, the third circuit distance, the fourth circuit distance and the fifth circuit distance may be respectively about 7 μm, about 18 μm, about 6 μm, about 7 μm and about 7 μm. Therefore, the minimum value of the width SWH1 of the sensing element portion SEP1 may be about 45 μm.

A width SWH2 of the sensing line portion SLP1 with respect to an aperture ratio of the touch screen display apparatus may be a sum of a first line distance, a second line distance, a third line distance, a fourth line distance, a fifth line distance and a sixth line distance.

The first distance and the third line distance may be widths of the first line and the third line and the fifth line distance may be a width of the contact portion. The second line distance, the fourth line distance and the sixth line distance may be areas between metal patterns, and the metal pattern may not be formed in the areas. For example, the minimum values of the first line distance, the second line distance, the third line distance, the fourth line distance, the fifth line distance and the sixth line distance may be respectively about 7 μm, about 7 μm, about 7 μm, about 7 μm, about 18 μm and about 7 μm. Therefore, the minimum value of the width SWH2 of the sensing line portion SLP1 may be about 53 μm.

The touch screen display apparatus may normally display an image if the width SWH1 of the sensing element portion SEP1 is substantially the same as the width SWH2 of the sensing line portion SLP1. Therefore, the minimum values of the width SWH1 and the width SWH2 may be about 53 μm.

A width of the reset portion RP in the second direction may be a sum of a first vertical distance, a second vertical distance and a third vertical distance.

The second vertical distance may be a width of the contact portion, and the first vertical distance and the third vertical distance may be areas between metal patterns. In this example, the metal pattern may not be formed in the areas.

For example, the minimum values of the first vertical distance, the second vertical distance and the third vertical distance may be respectively about 6 μm, about 18 μm and about 6 μm. Therefore, the minimum value of the width of the reset portion RP may be about 30 μm.

Generally, an aperture ratio of the display apparatus may be about 62%. In some examples, an aperture ratio of the touch screen display apparatus may be about 31%. However, an aperture ratio of the touch screen display apparatus may be about 38%. Therefore, the sensing portions SP may be divided into a plurality of sensing element portions SEP1 and sensing line portions SLP1 which are spaced apart from each other so that the aperture ratio of the touch screen display apparatus may be enhanced.

For example, the first switching element SW11 and the second switching element SW12 of the touch screen display apparatus may be formed to have relatively large sizes, and the electrodes of the sensing capacitor and the reference capacitor may be formed to have relatively large sizes. Therefore, a sensing characteristic may be improved.

Figure 5A:
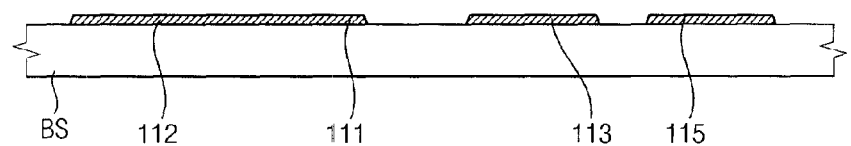
FIG. 5A, FIG. 5B and FIG. 5C are cross-sectional views explaining a method of manufacturing a touch display substrate of the touch screen display apparatus of FIG. 1.
Figure 5B:
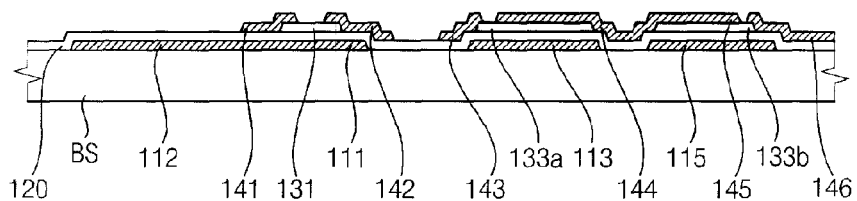
Figure 5C:
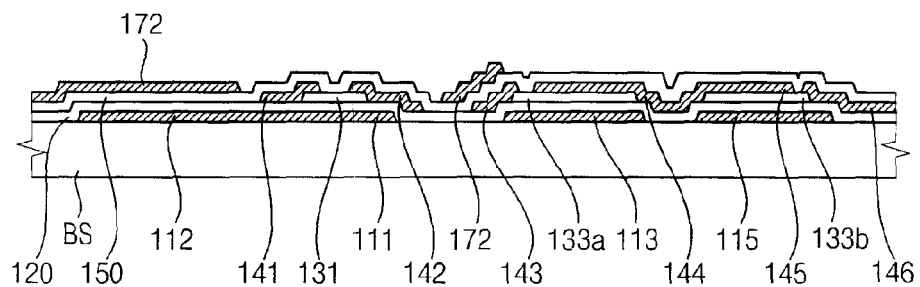

FIG. 5A, FIG. 5B and FIG. 5C are cross-sectional views explaining a method of manufacturing a touch display substrate of the touch screen display apparatus of FIG. 1.

Referring to FIG. 4 and FIG. 5A, a gate metal layer on a base substrate BS may be patterned to form gate metal patterns.

The gate metal patterns may include a plurality of gate lines Gn, Gn+1 and Gn+2, the first electrode 112 of the reference capacitor Cref, the reset control electrode 111 of the reset element RS, the first control electrode 113 of the first switching element SW11 and the second control electrode 115 of the second switching element SW12.

Referring to FIG. 4 and FIG. 5B, the gate insulating layer 120 may be formed on the base substrate BS to cover the gate metal pattern.

In some examples, the semiconductor layers 131, 133a and 133b may be formed on the gate insulating layer 120.

A data metal layer may be formed on the gate insulating layer 120 to cover the semiconductor layers 131, 133a and 133b, and the data metal layer may be patterned to form data metal patterns.

The data metal patterns may include, for example, a plurality of data lines DLm+2 and DLm+3, a plurality of voltage lines VLj, a plurality of reset lines RLj, a plurality of sensing lines SLj, the reset input electrode 141 and the reset output electrode 142 of the reset element RS, the first input electrode 143 and the first output electrode 144 of the first switching element SW11, and the second input electrode 145 and the second output electrode 146 of the second switching element SW12.

Referring to FIG. 4 and FIG. 5C, the data insulating layer 150 may be formed on the base substrate BS to cover the data metal patterns.

For example, the pixel electrode PE and the transparent electrode 172 may be formed on the data insulating layer 150.

Figure 6:
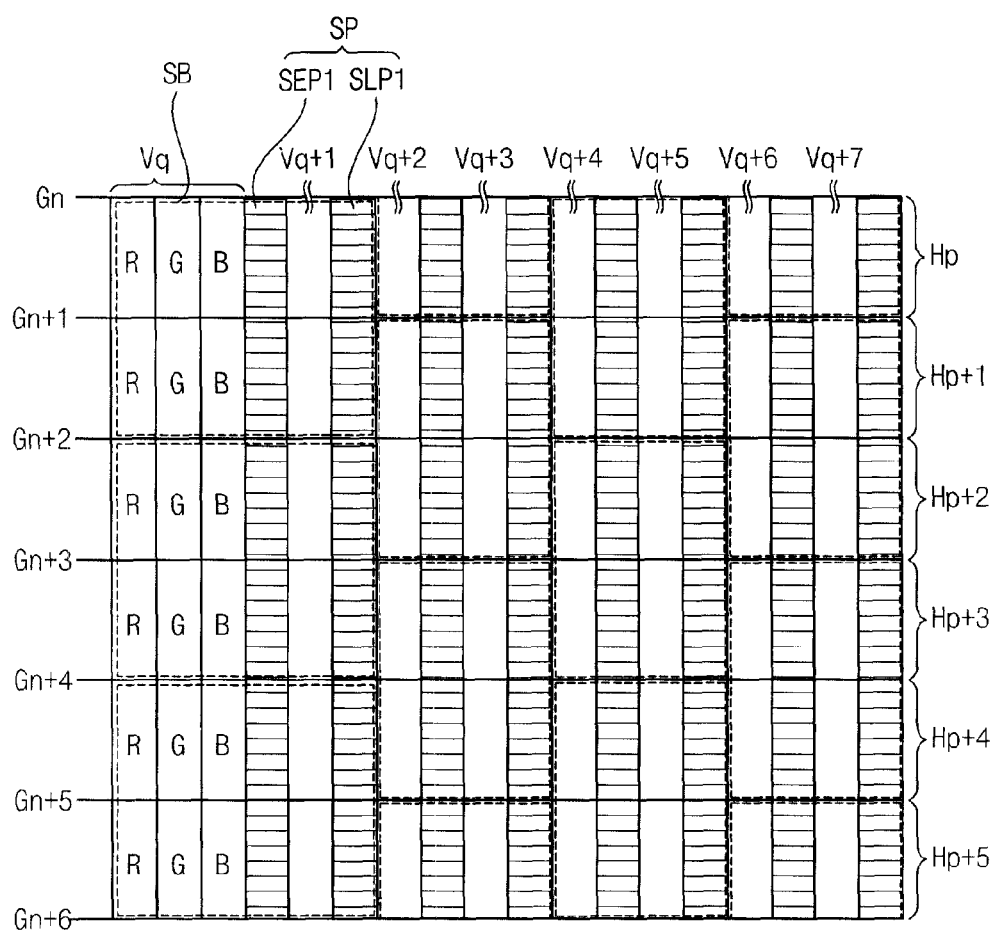
FIG. 6 is a plan view illustrating an arrangement of areas included in the sensing portion of the touch screen display apparatus of FIG. 1.
Figure 7:
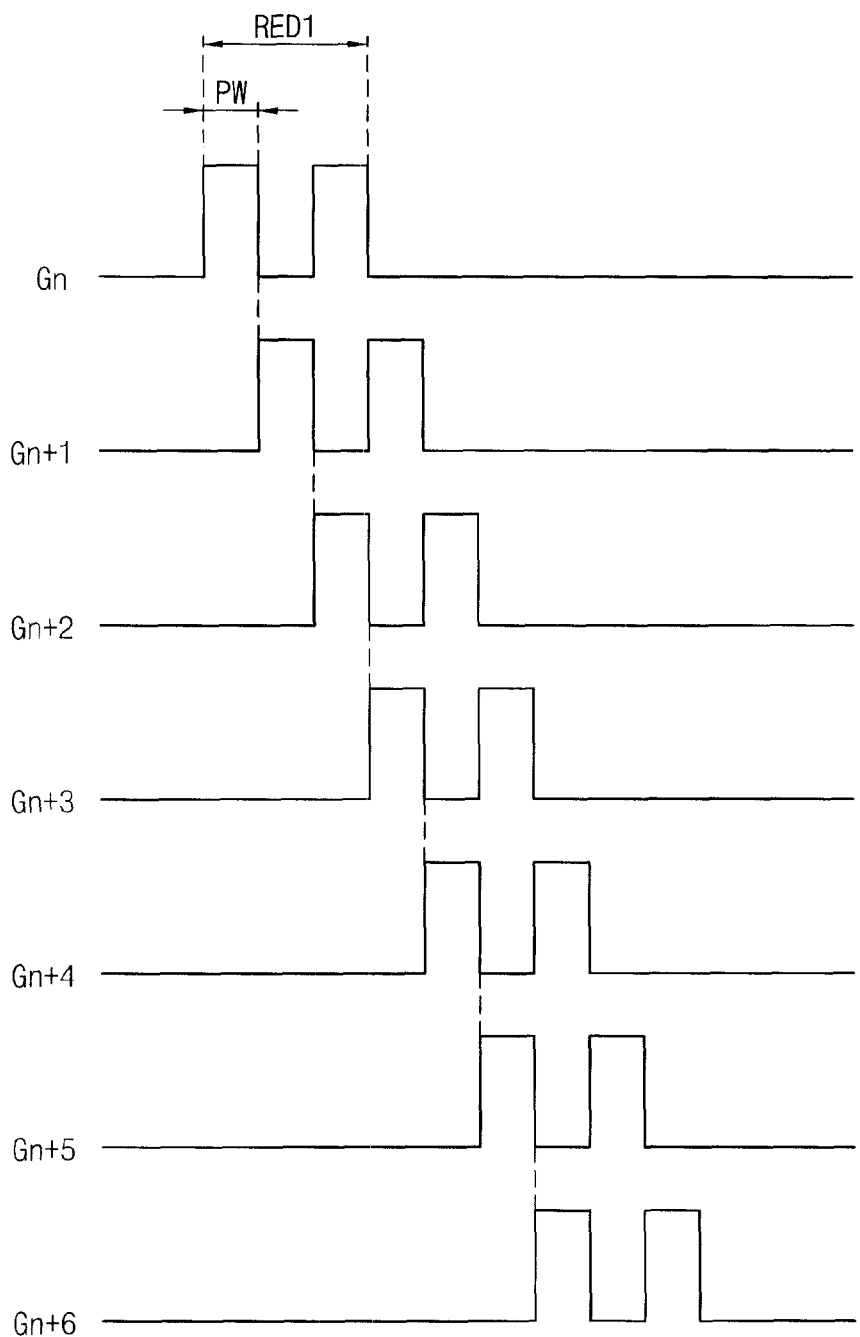
FIG. 7 is a diagram illustrating gate signals provided to the touch screen display apparatus of FIG. 1.

FIG. 6 is a plan view illustrating an arrangement of areas included in the sensing portion of the touch screen display apparatus of FIG. 1. FIG. 7 is a diagram illustrating gate signals provided to the touch screen display apparatus of FIG. 1.

In this example, the gate signal can be applied to a multi gate line driving to increase a sensing sensitivity.

Referring to FIG. 1, FIG. 6 and FIG. 7, the touch screen display apparatus may include a plurality of pixel portions and a plurality of sensing portions SP.

The pixel portions may include a plurality of horizontal lines Hp, Hp+1, Hp+2, Hp+3, Hp+4 and Hp+5 and a plurality of vertical lines Vq, Vq+1, Vq+2, Vq+3, Vq+4, Vq+5, Vq+6 and Vq+7.

The sensing element portion SEP1 and the sensing line portion SLP1, which are included in each of the sensing portions SP, may alternately be disposed between the adjacent vertical lines.

As illustrated in FIG. 1, FIG. 6 and FIG. 7, in case of defining a sensing block SB of 2×2 matrix structure, each sensing block SB may be arranged side by side in the second direction, and may be dislocated by one horizontal line in the first direction.

In some examples, the touch display substrate may include the sensing blocks SB of 2×2 matrix structure so that two times of a pulse width PW of gate signals applied to the gate lines Gn, Gn+1, Gn+2, Gn+3, Gn+4, Gn+5 and Gn+6 may be a distance RED1 between rising edges of the pulses. Due to the distance RED1 between the rising edges of the pulses of the gate signals, sensing blocks corresponding to the same vertical line may be detected at the same time, and a coupling between different gate lines may be prevented.

Figure 8:
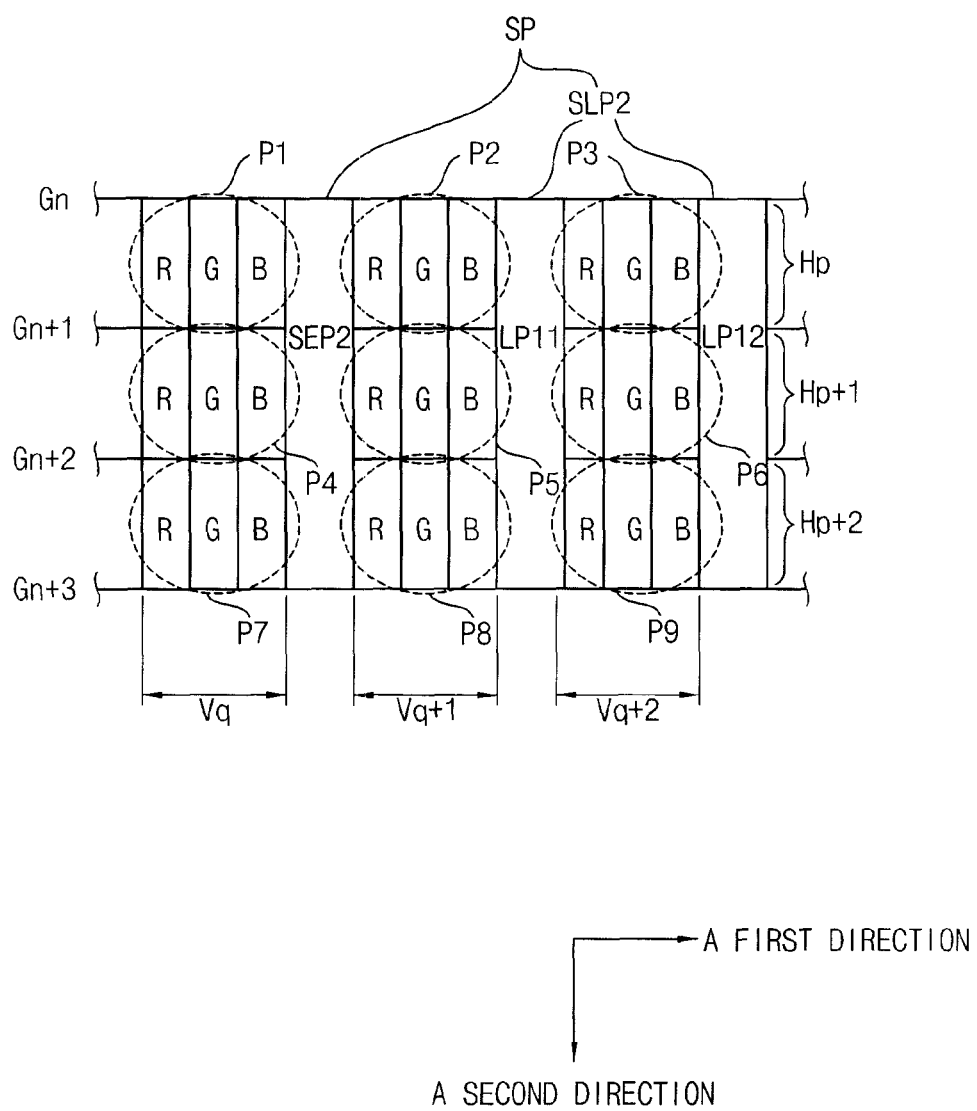
FIG. 8 is a plan view illustrating a touch screen display apparatus according to exemplary embodiments of the present invention.
Figure 9:
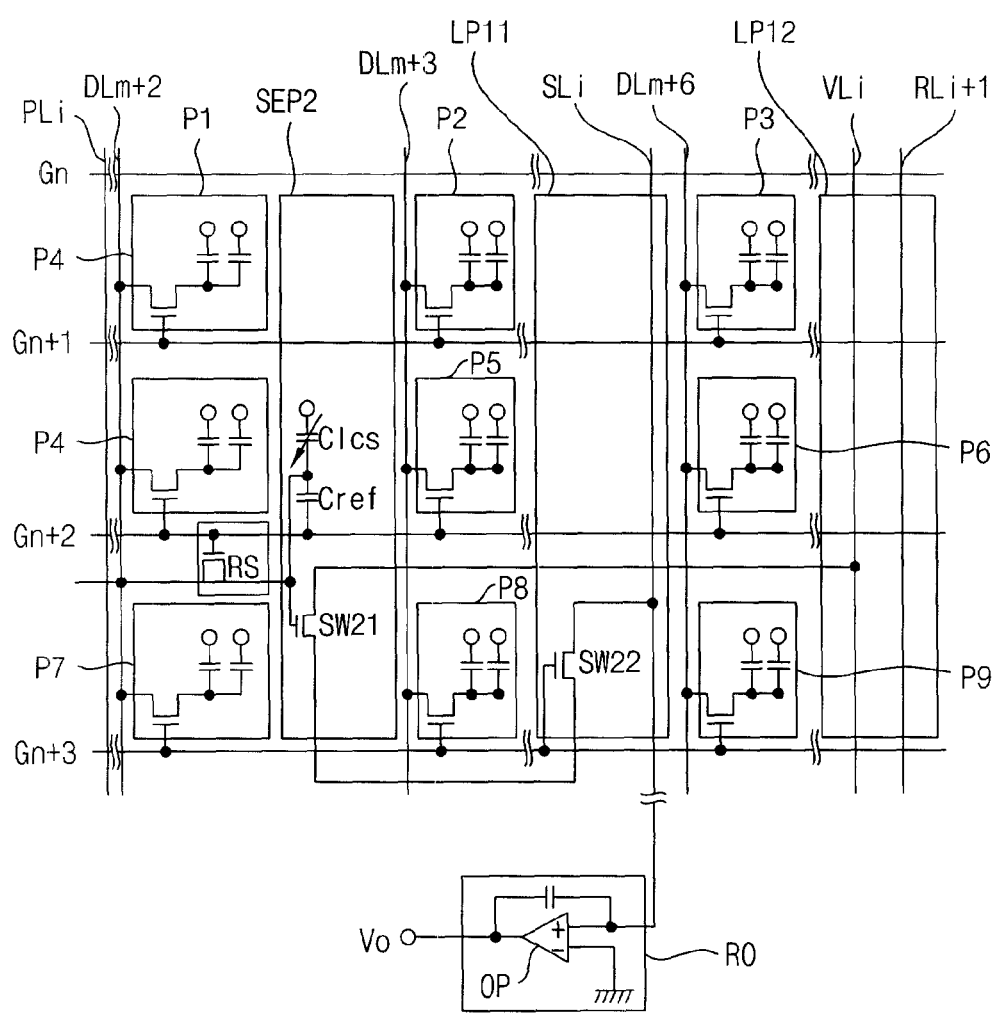
FIG. 9 is a circuit diagram illustrating a pixel portion and a sensing portion of the touch screen display apparatus of FIG. 8.

FIG. 8 is a plan view illustrating a touch screen display apparatus according to exemplary embodiments of the present invention. FIG. 9 is a circuit diagram illustrating a pixel portion and a sensing portion of the touch screen display apparatus of FIG. 8.

The touch screen display apparatus may be substantially the same as the touch screen display apparatus according to exemplary embodiments described with reference to FIG. 1, FIG. 2, FIG. 3, FIG. 4, FIG. 5, FIG. 6 and FIG. 7 except that a sensing line portion SLP2 includes a second switching element SW22, that the sensing line portion SLP2 includes a first line portion LP11 and a second line portion LP12 which are spaced apart from each other, and that each sensing portion SP is disposed to have a length corresponding to three horizontal lines Hp, Hp+1 and Hp+2 and is disposed corresponding to three vertical lines Vq, Vq+1 and Vq+2. Therefore, the same reference numerals may be used to refer to the same or like parts as those described in the previous exemplary embodiment with reference to FIG. 1, FIG. 2, FIG. 3, FIG. 4, FIG. 5, FIG. 6 and FIG. 7 and any redundant explanation concerning the above elements may be omitted in order to avoid unnecessarily obscuring the invention.

A first pixel portion P1, a second pixel portion P2, a third pixel portion P3, a fourth pixel portion P4, a fifth pixel portion P5, a sixth pixel portion P6, a seventh pixel portion P7, a eighth pixel portion P8 and a ninth pixel portion P9 may be illustrated in FIG. 9. Thus, the touch display substrate 101 may include a plurality of gate lines, for example, Gn, Gn+1, Gn+2 and Gn+3, and a plurality of data lines, for example, DLm+2, DLm+3 and DLm+6.

Referring to FIG. 1, FIG. 8 and FIG. 9, the sensing element portion SEP2 may include a reference capacitor Cref, a sensing capacitor Clcs and a first switching element SW21.

The first line portion LP11 may include the second switching element SW22 and an i-th sensing line SLi.

The reference capacitor Cref and the sensing capacitor Clcs of the sensing element portion SEP2 may be disposed between the fourth pixel P4 and the fifth pixel P5, and the first switching element SW21 of the sensing element portion SEP2 may be disposed between the seventh pixel P7 and the eighth pixel P8.

The second switching element SW22 of the first line portion LP11 may be disposed between the eighth pixel P8 and the ninth pixel P9, and may be coupled to the i-th sensing line SLi.

The second line portion LP12 may include an i-th voltage line VLi and an (i+1)-th reset line RLi+1 which extend in the second direction.

Connections of I/O lines of the sensing line portion SLP2, the sensing element portion SEP2, the second switching element SW22 and the reset portion RP may substantially be the same as the connections according to exemplary embodiments described with reference to FIG. 1, FIG. 2, FIG. 3, FIG. 4, FIG. 5, FIG. 6 and FIG. 7. Therefore, any further descriptions concerning the same or similar elements may be omitted in order to avoid unnecessarily obscuring the invention.

Figure 10:
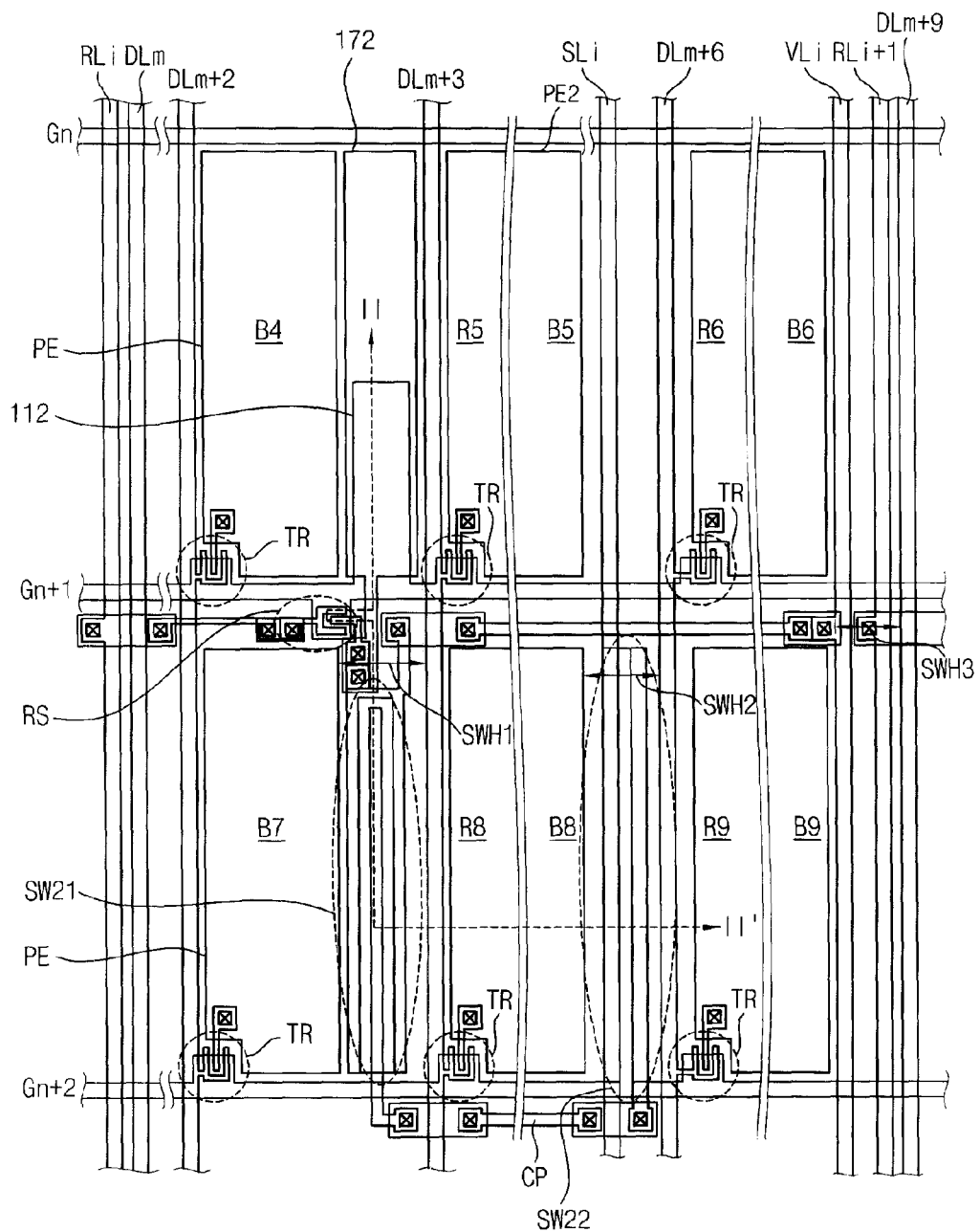
FIG. 10 is a plan view illustrating a connection between a sensing element portion and a sensing line portion of FIG. 8.
Figure 11:
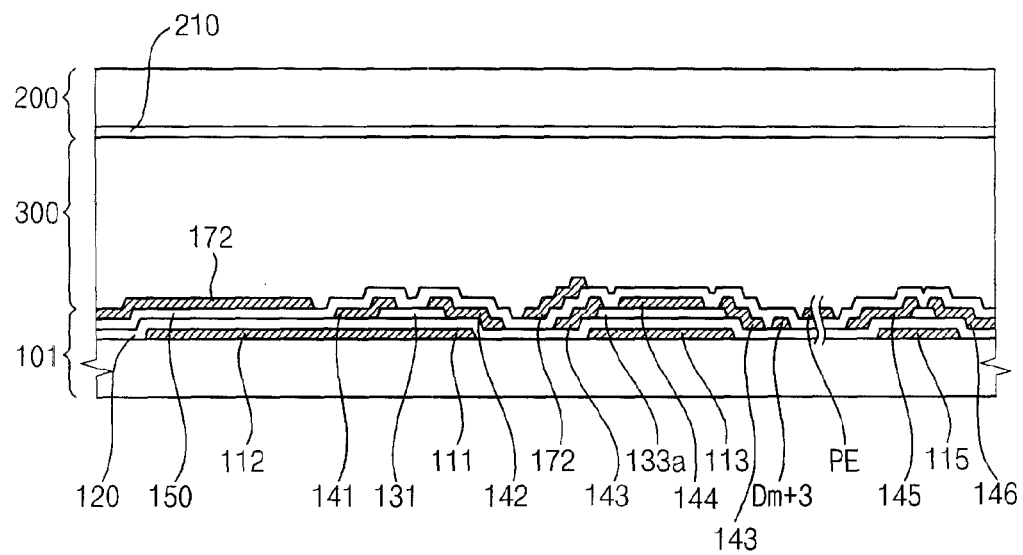
FIG. 11 is a cross-sectional view taken along a line II-IF of FIG. 10.

FIG. 10 is a plan view illustrating a connection between a sensing element portion and a sensing line portion of FIG. 8. FIG. 11 is a cross-sectional view taken along a line II-IF of FIG. 10.

FIG. 11 may substantially be the same as FIG. 4 except that the eighth pixel portion P8 is formed between the first switching element SW21 and the second switching element SW22. Thus, the same reference numerals may be used to refer to the same or like parts as those described in the exemplary embodiment in FIG. 4 and any further redundant explanation concerning the above elements may be omitted in order to avoid unnecessarily obscuring the invention.

Referring to FIG. 3, FIG. 8, FIG. 10 and FIG. 11, the touch display substrate 101 may include a plurality of gate lines Gn+1, Gn+2 and Gn+3, a plurality of data lines DLm, DLm+2, DLm+3, DLm+6 and DLm+9, a plurality of voltage lines VLj, a plurality of reset lines RLj and a plurality of sensing lines SLj. The gate lines Gn+1, Gn+2 and Gn+3 may extend in the first direction. The data lines DLm, DLm+2, DLm+3, DLm+6 and DLm+9, voltage lines VLj, reset lines RLj and sensing lines SLj may extend in the second direction.

The blue pixel B4 of the fourth pixel portion P4 in FIG. 10 may substantially be the same as the blue pixel B1 in FIG. 3, and the blue pixel B7 of the seventh pixel portion P7 in FIG. 10 may substantially be the same as the blue pixel B3 in FIG. 3. Therefore, any further descriptions concerning the same or similar elements may be omitted in order to avoid unnecessarily obscuring the invention.

The reference capacitor Cref and the sensing capacitor Clcs of the sensing element portion SEP2 may be formed between the blue pixel B4 of the fourth pixel portion P4 and a red pixel R5 of the fifth pixel portion P5. The first switching element SW21 of the sensing element portion SEP2 may be disposed between the blue pixel B7 of the seventh pixel portion P7 and a red pixel R8 of the eighth pixel portion P8. The second switching element SW22 of the sensing line portion SLP2 may be disposed between a blue pixel B8 of the eighth pixel portion P8 and a red pixel R9 of the ninth pixel portion P9.

Input and out (I/O) lines of the sensing line portion SLP2 may extend in the second direction between adjacent vertical lines Vq+1 and Vq+2 or adjacent vertical lines Vq+2 (not illustrated).

The sensing element portion SEP1 in FIG. 3 may include the first switching element SW11 and the second switching element SW12. However, the sensing element portion SEP2 in FIG. 8 may include only the first switching element SW21 so that the first switching element SW21 may be formed to relatively be large in size.

The second switching element SW22 may be formed in the first line portion LP11 and may be coupled to the i-th sensing line SLi. A source electrode of the second switching element SW22 may have a bar shape extending in the second direction. Therefore, an effective channel width of the source electrode having a bar shape and a drain electrode of the second switching element SW22 which is a portion of the i-th sensing line SLi may be smaller than that of the switching element having a U shape.

A connection part CP connecting the first switching element SW21 with the second switching element SW22 may divide the first switching element SW21 and the second switching element SW22 into different areas. Parasitic capacitances may be formed between the data line DLm+3 and the connection part CP, and between the data lines for green pixel portion and blue pixel portion adjacent to the data line DLm+3 and the connection part CP. The parasitic capacitances may decrease a coupling of data signals and the i-th sensing line SLi, the data signals transmitted from the data line DLm+3 and the data lines for green and blue pixel portions adjacent to the data line DLm+3. As explained in exemplary embodiments in FIG. 1, FIG. 2, FIG. 3, FIG. 4, FIG. 5, FIG. 6 and FIG. 7, the minimum value of the width SWH1 of the sensing element portion SEP2 with respect to an aperture ratio of the touch screen display apparatus may be 45 µm.

A width SWH2 of the first line portion LP11 with respect to an aperture ratio of the touch screen display apparatus may be related to a width of the second switching element SW22.

The width SWH2 of the first line portion LP11 in the first direction may be a sum of a fourth circuit distance, a fifth circuit distance and a sixth circuit distance.

The fifth circuit distance may be the width of the second switching element SW22, and the first circuit distance and the third circuit distance are areas between metal patterns. In this example, the metal pattern may not be formed in the areas.

For example, the minimum values of the fourth circuit distance, the fifth circuit distance and the sixth circuit distance may be respectively about 7 µm, about 17 µm and about 6 µm. Therefore, the minimum value of the width SWH2 of the first line portion LP11 may be about 30 µm.

A width SWH3 of the second line portion LP12 in the first direction with respect to an aperture ratio of the touch screen display apparatus may be a sum of a first line distance, a second line distance, a third line distance and a fourth line distance.

The first line distance may be a width of the line, and the third line distance may be a width of a contact portion, and the second line distance and fourth line distance are areas between metal patterns. In this example, the metal pattern may not be formed in the areas. For example, the minimum values of the first line distance, the second line distance, the third line distance and the fourth line distance may respectively be about 7 µm, about 7 µm, about 18 µm and about 7 µm. Therefore, the minimum value of the width SWH3 of the second line portion LP12 may be about 39 µm. The touch screen display apparatus may normally display an image if the width SWH1, the width SWH2 and the width SWH3 are substantially the same with each other. Therefore, the minimum values of the width SWH1, the width SWH2 and the width SWH3 may be about 45 µm.

The minimum of a width of the reset portion RP in the second direction may be substantially the same as the minimum of the width of the reset portion RP according to exemplary embodiments in FIG. 1, FIG. 2, FIG. 3, FIG. 4, FIG. 5, FIG. 6 and FIG. 7.

For example, an aperture ratio of the display apparatus may be about 62%. In some examples, an aperture ratio of the touch screen display apparatus may be about 31%. An aperture ratio of the touch screen display apparatus according to exemplary embodiments in FIG. 1, FIG. 2, FIG. 3, FIG. 4, FIG. 5, FIG. 6 and FIG. 7 may be about 38%. However, an aperture ratio of the touch screen display apparatus, for example, may be about 40%. In some examples, the sensing portions SP may be divided into the sensing element portion SEP2 and the sensing line portion SLP2, and the sensing line portion SLP2 may be divided into the first line portion LP11 and the second line portion LP12 so that the aperture ratio of the touch screen display apparatus may be enhanced more than that of the touch screen display apparatus according to exemplary embodiments in FIG. 1, FIG. 2, FIG. 3, FIG. 4, FIG. 5, FIG. 6 and FIG. 7.

In addition, the first switching element SW21 and the second switching element SW22 of the touch screen display apparatus may be formed to have relatively large sizes, and the electrodes of the sensing capacitor and the reference capacitor may be formed to have relatively large sizes. Therefore, a sensing characteristic may be improved.

Figure 12A:
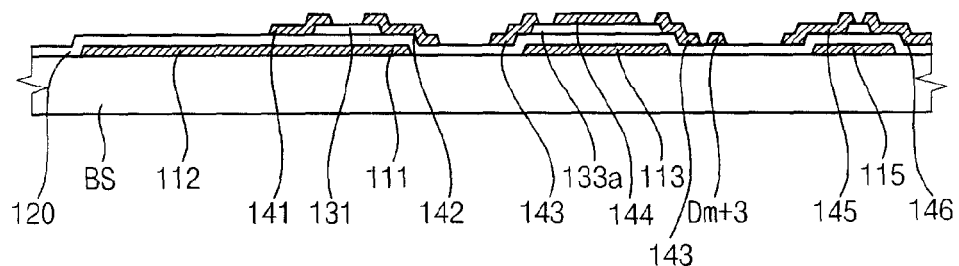
FIG. 12A and FIG. 12B are cross-sectional views of a method of manufacturing a touch display substrate of the touch screen display apparatus of FIG. 8.
Figure 12B:
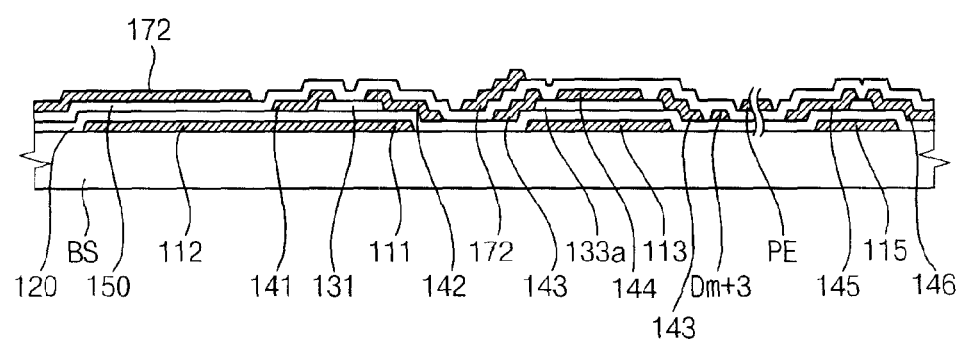

FIG. 12A and FIG. 12B are cross-sectional views of a method of manufacturing a touch display substrate of the touch screen display apparatus of FIG. 8.

The method of manufacturing metal patterns may be substantially the same as the method according to exemplary embodiments described in FIG. 5A. Therefore, any further descriptions concerning the same or similar elements may be omitted in order to avoid unnecessarily obscuring the invention.

Referring to FIG. 5B, FIG. 8 and FIG. 12A, the gate insulating layer 120 may be formed on the base substrate BS to cover the gate metal patterns.

In some examples, the semiconductor layers 131, 133a and 133b may be formed on the gate insulating layer 120.

A data metal layer may be formed on the gate insulating layer 120 to cover the semiconductor layers 131, 133a and 133b, and the data metal layer may be patterned to form data metal patterns.

The data metal patterns may substantially be the same as the metal patterns according to exemplary embodiments described in FIG. 5B except that the metal patterns in FIG. 12A may further include the data line DLm+3. Therefore, any further descriptions concerning the same or similar elements may be omitted in order to avoid unnecessarily obscuring the invention.

Referring to FIG. 5C, FIG. 8 and FIG. 12B, the data insulating layer 150 may be formed on the base substrate BS to cover the data metal patterns.

For example, the pixel electrode PE and the transparent electrode 172 may be formed on the data insulating layer 150.

Figure 13:
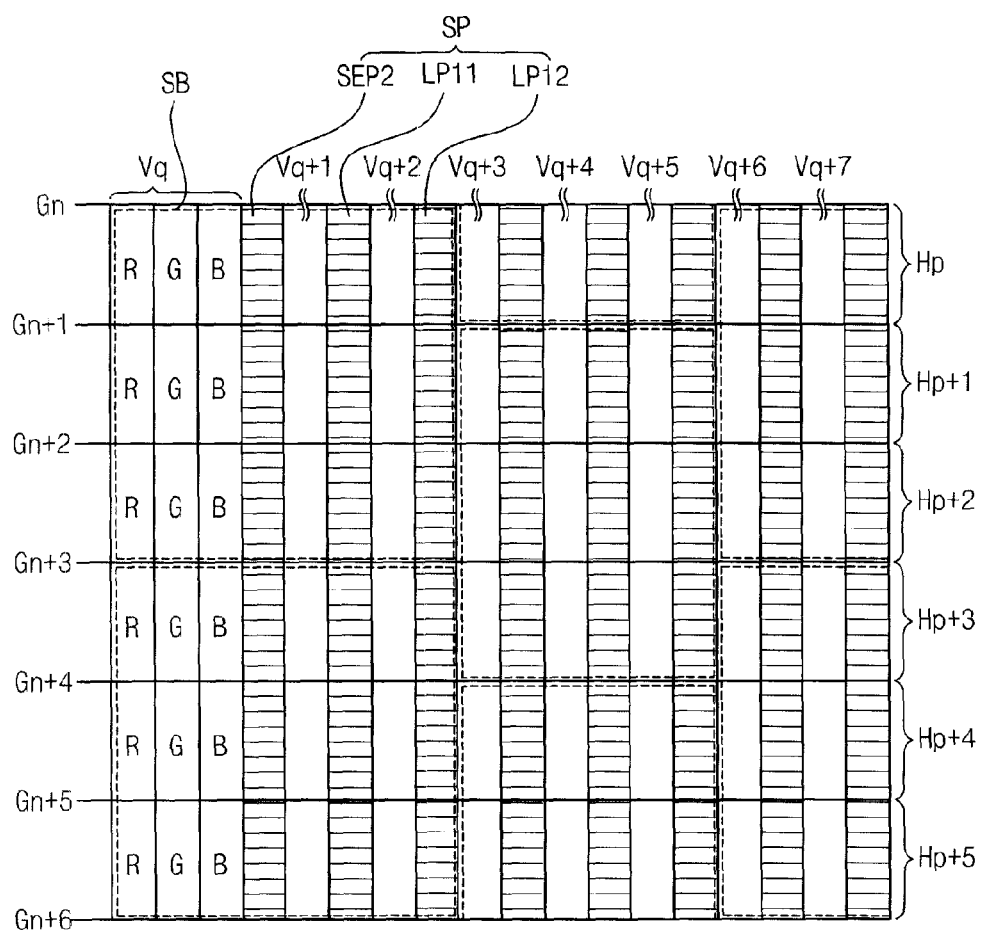
FIG. 13 is a plan view illustrating an arrangement of areas of the sensing portion of the touch screen display apparatus of FIG. 8.
Figure 14:
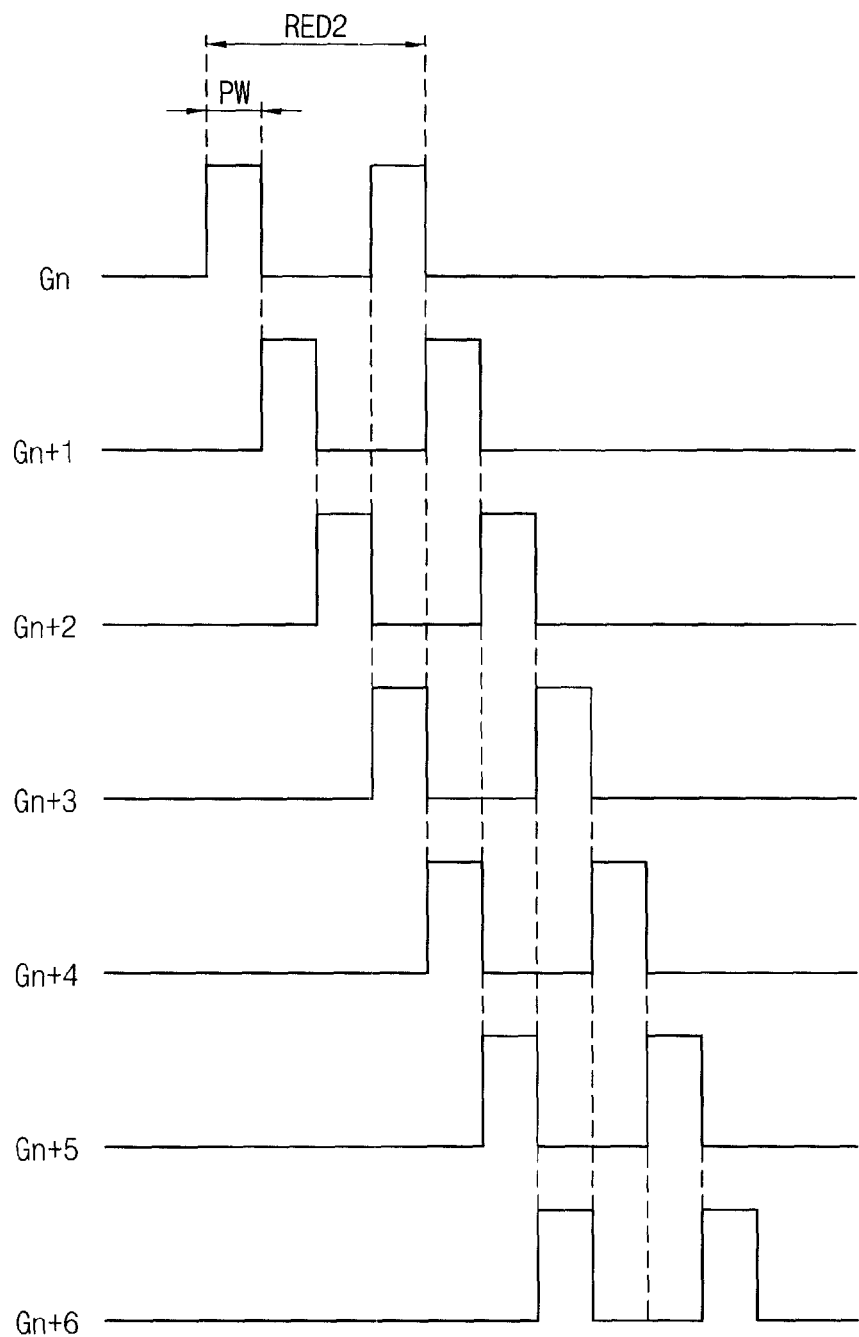
FIG. 14 is a diagram illustrating gate signals provided to the touch screen display apparatus of FIG. 13.

FIG. 13 is a plan view illustrating an arrangement of areas of the sensing portion of the touch screen display apparatus of FIG. 8. FIG. 14 is a diagram illustrating gate signals provided to the touch screen display apparatus of FIG. 13.

The gate signal can be applied to a multi gate line driving to increase a sensing sensitivity.

Referring to FIG. 7, FIG. 13 and FIG. 14, the touch screen display apparatus may include a plurality of pixel portions and a plurality of sensing portions SP.

The pixel portions may include a plurality of horizontal lines Hp, Hp+1, Hp+2, Hp+3, Hp+4 and Hp+5 and a plurality of vertical lines Vq, Vq+1, Vq+2, Vq+3, Vq+4, Vq+5, Vq+6 and Vq+7.

The sensing element portion SEP2, the first line portion LP11 and the second line portion LP12, which are included in each of the sensing portions SP, may alternately be disposed between the adjacent vertical lines.

As illustrated in FIG. 7, FIG. 13 and FIG. 14, in case of defining a sensing block SB of 3×3 matrix structure, each sensing block SB may be arranged side by side in the second direction, and may be dislocated by one horizontal line in the first direction.

In some examples, the touch display substrate may include the sensing blocks SB of 3×3 matrix structure, so that three times of a pulse width PW of gate signals applied to the gate lines Gn, Gn+1, Gn+2, Gn+3, Gn+4, Gn+5 and Gn+6 may be a distance RED2 between rising edges of the pulses. Due to the distance RED2 between the rising edges of the pulses of the gate signals, the sensing blocks corresponding to the same vertical line may be detected at the same time, and a coupling between different gate lines may be prevented.

Figure 15:
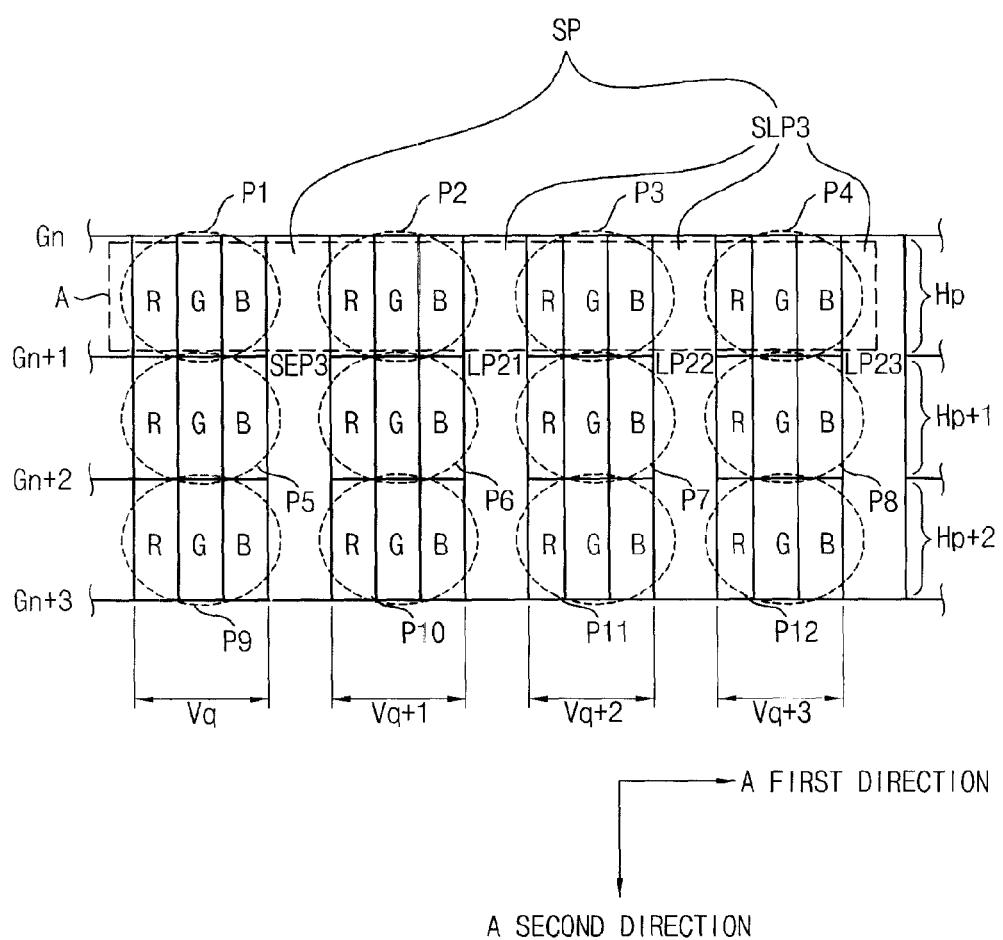
FIG. 15 is a plan view illustrating a touch screen display apparatus according to exemplary embodiments of the present invention.
Figure 16:
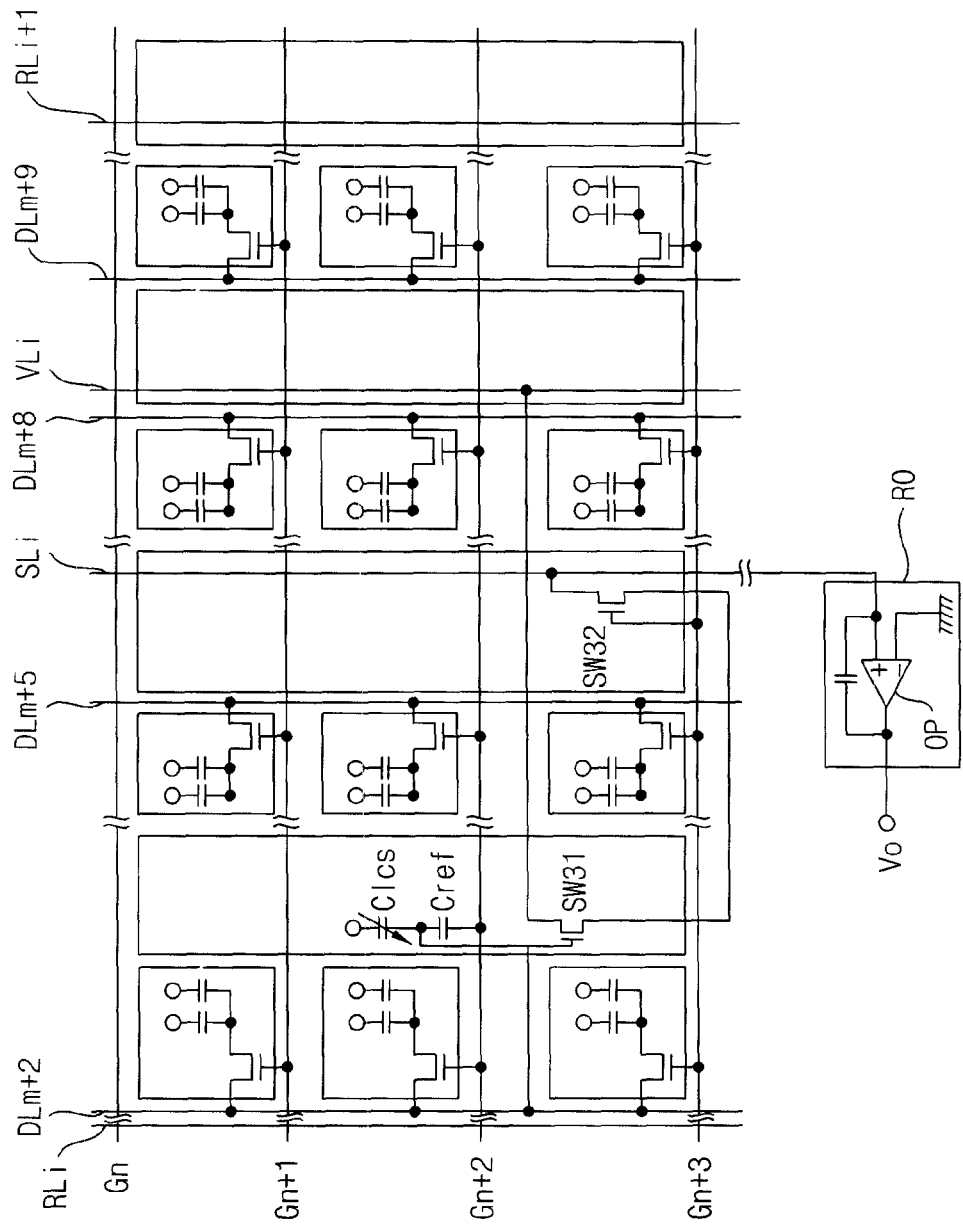
FIG. 16 is a circuit diagram illustrating a pixel portion and a sensing portion of the touch screen display apparatus of FIG. 15.

FIG. 15 is a plan view illustrating a touch screen display apparatus according to exemplary embodiments of the present invention. FIG. 16 is a circuit diagram illustrating a pixel portion and a sensing portion of the touch screen display apparatus of FIG. 15.

The touch screen display apparatus may substantially be the same as the touch screen display apparatus according to exemplary embodiments in FIG. 8, FIG. 9, FIG. 10, FIG. 11, FIG. 12, FIG. 13 and FIG. 14 except that the touch screen display apparatus includes a sensing line portion SLP3 including a first line portion LP21, a second line portion LP22 and a third line portion LP23 which are spaced apart from each other, and that each sensing portion SP is disposed corresponding to four vertical lines Vq, Vq+1, Vq+2 and Vq+3. Therefore, the same reference numerals may be used to refer to the same or like parts as those described in the previous example embodiment in FIG. 1, FIG. 2, FIG. 3, FIG. 4, FIG. 5, FIG. 6 and FIG. 7 and any further repetitive explanation concerning the above elements may be omitted in order to avoid unnecessarily obscuring the invention.

A first pixel portion P1, a second pixel portion P2, a third pixel portion P3, a fourth pixel portion P4, a fifth pixel portion P5, a sixth pixel portion P6, a seventh pixel portion P7, an eighth pixel portion P8, a ninth pixel portion P9, a tenth pixel portion P10, an eleventh pixel portion P11 and a twelfth pixel portion P12 are illustrated in FIG. 16. The touch display substrate 101 may include a plurality of gate lines Gn, Gn+1, Gn+2 and Gn+3, and a plurality of data lines DLm+2, DLm+5, DLm+8 and DLm+9.

Referring to FIG. 8, FIG. 15 and FIG. 16, the sensing portion SP may include a sensing element portion SEP3 for detecting a touch event and the sensing line portion SLP3.

The sensing line portion SLP3 may be divided into the first line portion LP21, the second line portion LP22 and the third line portion LP23 which respectively may include parts of I/O lines.

The sensing element portion SEP3 may include a reference capacitor Cref, a sensing capacitor Clcs and a first switching element SW31. The first line portion LP21 may include a second switching element SW32 and an i-th sensing line SLi. The reference capacitor Cref and the sensing capacitor Clcs of the sensing element portion SEP3 disposed between the fifth pixel P5 and the sixth pixel P6, and the first switching element SW31 of the sensing element portion SEP3 may be disposed between the ninth pixel P9 and the tenth pixel P10.

The second switching element SW32 of the first line portion LP21 may be disposed between the tenth pixel P10 and the eleventh pixel P11, and may be coupled to the i-th sensing line SLi.

The second line portion LP22 may include an i-th voltage line VLi extending in the second direction.

The second line portion LP23 may include an (i+1)-th reset line RLi+1 extending in the second direction.

Connections of the I/O lines of the sensing line portion SLP3, the sensing element portion SEP3, the second switching element SW32 and the reset portion RP may substantially be the same as the connections according to exemplary embodiments described with reference to FIG. 1, FIG. 2, FIG. 3, FIG. 4, FIG. 5, FIG. 6 and FIG. 7. Therefore, any further descriptions concerning the same or similar elements may be omitted in order to avoid unnecessarily obscuring the invention.

Figure 17:
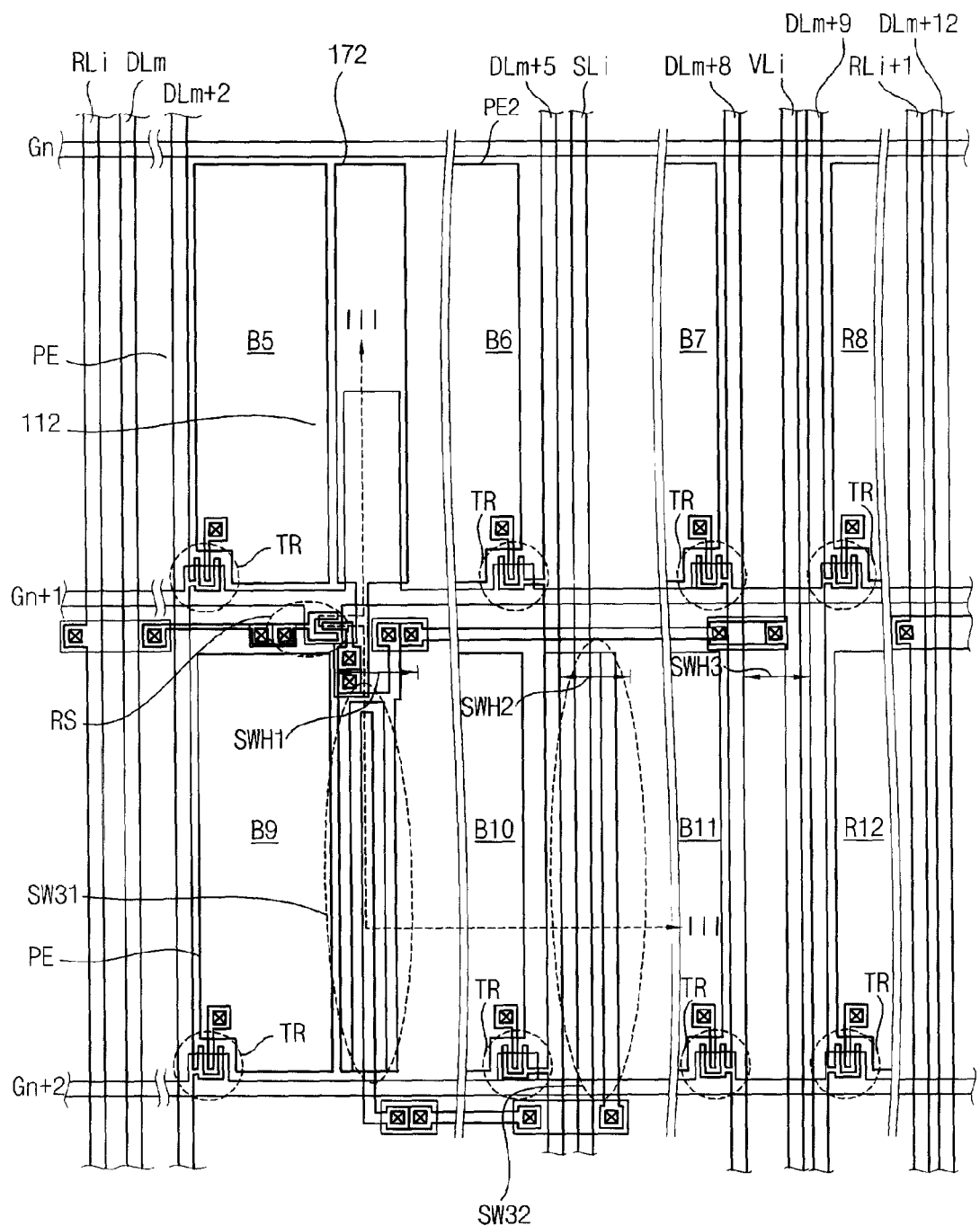
FIG. 17 is a plan view illustrating a connection between a sensing element portion and a sensing line portion of FIG. 15.
Figure 18:
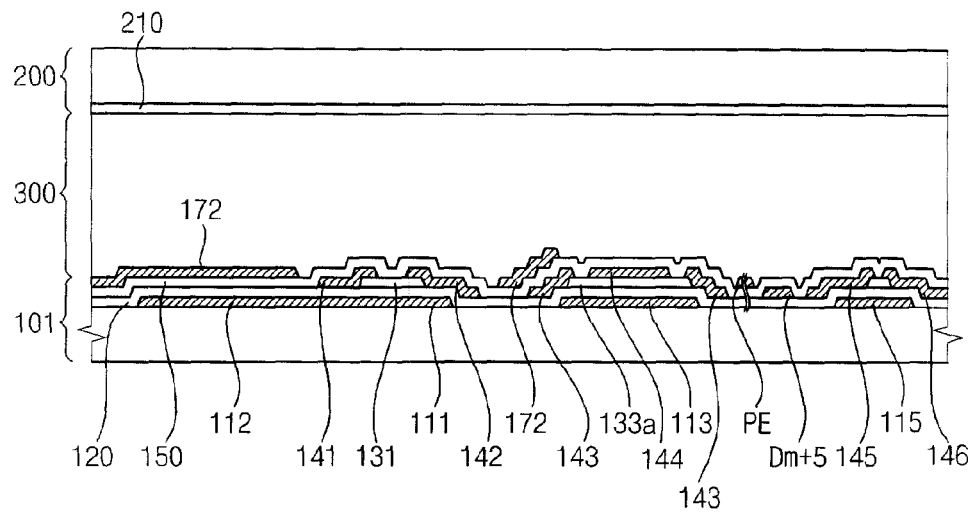
FIG. 18 is a cross-sectional view taken along a line III-III' of FIG. 17.

FIG. 17 is a plan view illustrating a connection between a sensing element portion and a sensing line portion of FIG. 15. FIG. 18 is a cross-sectional view taken along a line III-III' of FIG. 17.

FIG. 18 may be substantially the same as FIG. 10 except that the tenth pixel portion P10 is formed between the first switching element SW31 and the second switching element SW32, and that a data line DLm+1 is disposed at a right side of the tenth pixel portion P10. Therefore, the same reference numerals may be used to refer to the same or like parts as those described in the previous example embodiment in FIG. 10 and any further redundant explanation concerning the above elements may be omitted in order to avoid unnecessarily obscuring the invention.

A blue pixel B5 of the fifth pixel portion P5 in FIG. 17 may substantially be the same as the blue pixel B4 in FIG. 10, and a blue pixel B9 of the ninth pixel portion P9 in FIG. 17 may substantially be the same as the blue pixel B7 in FIG. 10. Therefore, any further descriptions concerning the same or similar elements may be omitted in order to avoid unnecessarily obscuring the invention.

Referring to FIG. 15, FIG. 16, FIG. 17 and FIG. 18, the reference capacitor Cref and the sensing capacitor Clcs of the sensing element portion SEP3 may be formed between the blue pixel B5 of the fifth pixel portion P5 and a red pixel of the sixth pixel portion P6. The first switching element SW31 of the sensing element portion SEP3 may be disposed between the blue pixel B9 of the ninth pixel portion P9 and a red pixel of the tenth pixel portion P10. The second switching element SW32 of the sensing line portion SLP2 may be disposed between a blue pixel B10 of the tenth pixel portion P10 and a red pixel of the eleventh pixel portion P11.

The I/O lines of the sensing line portion SLP3 may extend in the second direction between adjacent vertical lines Vq+1 and Vq+2 or adjacent vertical lines Vq+2, and Vq+3, or may extend from an other side of the vertical line Vq+3 in the second direction.

A width SWH1 of the sensing element portion SEP3 with respect to an aperture ratio of the touch screen display apparatus may be related to a width of the first switching element SW31.

The width SWH1 of the sensing element portion SEP3 in the first direction may be a sum of a first circuit distance, a second circuit distance and a third circuit distance.

The second circuit distance may be the width of the first switching element SW31, and the first circuit distance and the third circuit distance may be areas between metal patterns. In this example, the metal pattern may not be formed in the areas.

For example, the minimum values of the first circuit distance, the second circuit distance and the third circuit distance may be respectively about 6 μm, about 28 μm and about 6 μm. Therefore, the minimum value of the width SWH1 of the first area may be about 40 μm.

In some examples, the data line may not be formed at both sides of the sensing element portion SEP3 so that the width SWH1 is smaller than the width according to the exemplary embodiments in FIG. 1, FIG. 2, FIG. 3, FIG. 4, FIG. 5, FIG. 6 and FIG. 7 or the exemplary embodiments in FIG. 8, FIG. 9, FIG. 10, FIG. 11, FIG. 12, FIG. 13 and FIG. 14.

A width SWH2 of the first line portion LP21 with respect to an aperture ratio of the touch screen display apparatus may be related to a width of the second switching element SW32.

The width SWH2 of the first line portion LP21 in the first direction may be a sum of a fourth circuit distance, a fifth circuit distance and a sixth circuit distance.

The fifth circuit distance may be the width of the second switching element SW22, and the first circuit distance and the third circuit distance are areas between metal patterns. In this example, the metal pattern may not be formed in the areas.

For example, the minimum values of the fourth circuit distance, the fifth circuit distance and the sixth circuit distance may respectively be about 7 μm, about 17 μm and about 6 μm. Therefore, the minimum value of the width SWH2 of the first line portion LP21 may be about 30 μm.

A width SWH3 of the second line portion LP22 with respect to an aperture ratio of the touch screen display apparatus may be a sum of a first line distance, a second line distance, a third line distance.

The second line distance may be a distance of a contact portion, and the first line distance and the third line distance may be areas between metal patterns. In this example, the metal pattern may not be formed in the areas.

For example, the minimum values of the first line distance, the second line distance and the third line distance may respectively be about 7 μm, about 18 μm and about 7 μm. Therefore, the minimum value of the width SWH3 of the second line portion LP22 may be about 32 μm.

In some examples, width SWH4 of the third line portion LP23 with respect to an aperture ratio of the touch screen display apparatus may need to be same as the width SWH2.

The minimum value of a width of the reset portion RP in the second direction may substantially be the same as the minimum value of the width of the reset portion RP according to exemplary embodiments in FIG. 1, FIG. 2, FIG. 3, FIG. 4, FIG. 5, FIG. 6 and FIG. 7.

Figure 19A:
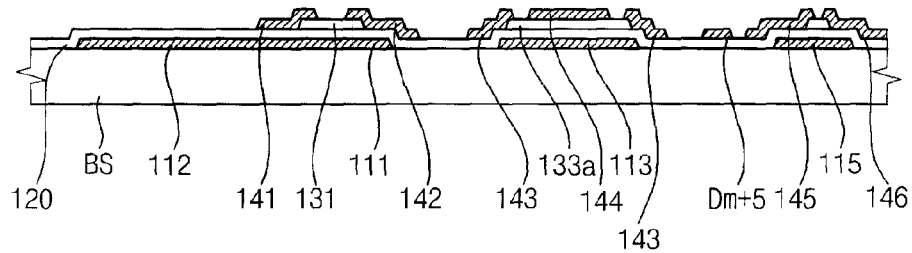
FIG. 19A and FIG. 19B are cross-sectional views explaining a method of manufacturing a touch display substrate of the touch screen display apparatus of FIG. 15.
Figure 19B:
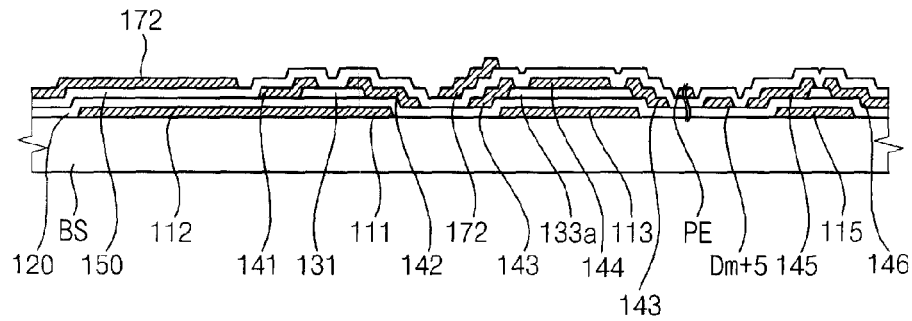

FIG. 19A and FIG. 19B are cross-sectional views explaining a method of manufacturing a touch display substrate of the touch screen display apparatus of FIG. 15.

The method of manufacturing metal patterns may substantially be the same as the method according to exemplary embodiments described in FIG. 5A. Therefore, any further descriptions concerning the same or similar elements may be omitted in order to avoid unnecessarily obscuring the invention.

Referring to FIG. 5B, FIG. 15 and FIG. 19A, the gate insulating layer 120 may be formed on the base substrate BS to cover the gate metal patterns.

In some examples, the semiconductor layers 131, 133a and 133b may be formed on the gate insulating layer 120.

Then, a data metal layer may be formed on the gate insulating layer 120 to cover the semiconductor layers 131, 133a and 133b, and the data metal layer may be patterned to form data metal patterns.

The data metal patterns may substantially be the same as the metal patterns described in FIG. 12A except that the metal patterns in FIG. 19A may further include the data line DLm+3 and a position of the metal patterns is different from a position of the metal patterns according to exemplary embodiment in FIG. 12A. Therefore, any further descriptions concerning the same or similar elements may be omitted in order to avoid unnecessarily obscuring the invention.

Referring to FIG. 5C, FIG. 15 and FIG. 19B, the data insulating layer 150 may be formed on the base substrate BS to cover the data metal patterns.

In some examples, the pixel electrode PE and the transparent electrode 172 may be formed on the data insulating layer 150.

Figure 20:
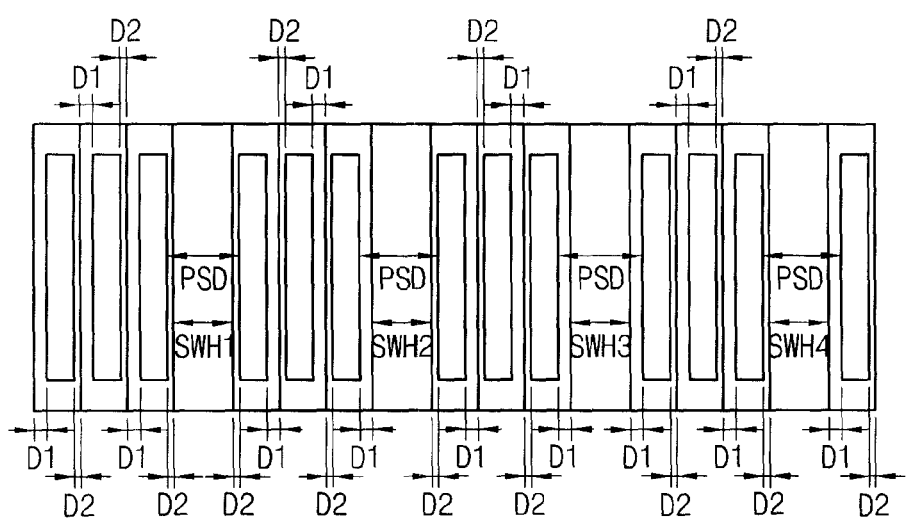
FIG. 20 is an enlarged plan view illustrating a portion 'A' of the touch screen display apparatus of FIG. 15.

FIG. 20 is an enlarged plan view illustrating a portion 'A' of the touch screen display apparatus of FIG. 15.

Referring to FIG. 15, FIG. 16, FIG. 17 and FIG. 20, for a normal display, the pixel separation distances PSD of the touch screen display apparatus may substantially be the same with each other and substantially be uniform. The pixel separation distance PSD may be defined as a distance between pixel portions in the first direction.

Among a plurality of data lines DLm, DLm+2, DLm+5, DLm+8, DLm+9 and DLm+12, the first and fourth data lines DLm+2 and DLm+9 may be formed at left sides of the first pixel P1 and the fourth pixel P4, and the second and third data lines DLm+5 and DLm+8 may be formed at right sides of the second pixel P2 and the third pixel P3. Therefore, a distance of area including the data lines DLm, DLm+2, DLm+5, DLm+8, DLm+9 and DLm+12 in the first direction may be defined as a first distance D1, and a distance of area excluding the data lines DLm, DLm+2, DLm+5, DLm+8, DLm+9 and DLm+12 in the first direction may be defined as a second distance D2.

An area corresponding to the first distance D1 and an area corresponding to the second distance D2 may be covered with a blocking pattern (not illustrated) which may be formed on the opposite substrate 200 or the touch display substrate 102.

The pixel separation distance PSD may be defined as below Equation 2, Equation 3 and Equation 4 which use the width SWH1 of the sensing element portion SEP3, the width SWH2 of the first line portion LP21, the width SWH3 of the second line portion LP22, the first distance D1 and the second distance D2.

$$PSD = SWH1 + (2 \times D2) \qquad \text{Equation 2}$$

$$PSD = SWH2 + D1 + D2 \qquad \text{Equation 3}$$

$$PSD = SWH3 + (2 \times D1) \qquad \text{Equation 4}$$

For example, the first distance D1 may be about 15 µm, and the second distance D2 may be about 7.5 µm.

If no data line is disposed between pixel portions adjacent to the sensing portion SP, the pixel separation distance PSD may be obtained from Equation 2. If one data line is disposed between the pixel portions adjacent to the sensing portion SP, the pixel separation distance PSD may be obtained from Equation 3. If two data lines are disposed between the pixel portions adjacent to the sensing portion SP, the pixel separation distance PSD may be obtained from Equation 4.

Referring to FIG. 17, the minimum values of the width SWH1 of the sensing element portion SEP3, the width SWH2 of the first line portion LP21 and the width SWH3 of the second line portion LP22 may be respectively about 40 µm, about 30 µm and about 32 µm. The width SWH1 of the sensing element portion SEP3, the width SWH2 of the first line portion LP21 and the width SWH3 of the second line portion LP22 which satisfy the minimum values and Equation 2, Equation 3 and Equation 4 may be designed at the same time.

In some examples, the minimum values satisfying Equation 2, Equation 3, and Equation 4 may be SWH1=47 µm, SWH2=39.5 µm and SWH3=32 µm. Therefore, SWH3 may determine the minimum value.

In some examples an aperture ratio of a display apparatus may be about 62%. For example, an aperture ratio of a touch screen display apparatus may be about 31%. An aperture ratio of the touch screen display apparatus may be about 42%. For example, the sensing portions SP may be divided into the sensing element portion SEP3 and the sensing line portion SLP3, and the sensing line portion SLP3 may be divided into the first line portion LP21, the second line portion LP22 and the third line portion LP23, and the data lines may be arranged at more right side than in some pixel columns or at more left side than in some pixel columns so that an aperture ratio of the touch screen display apparatus may be enhanced more than that of the touch screen display apparatus according to exemplary embodiments in FIG. 8, FIG. 9, FIG. 10, FIG. 11, FIG. 12, FIG. 13 and FIG. 14. The data lines may selectively be disposed at a first side or at a second side of the pixel columns so that an aperture ratio of the touch screen display apparatus may be enhanced more than that of the touch screen display apparatus according to exemplary embodiments in FIG. 8, FIG. 9, FIG. 10, FIG. 11, FIG. 12, FIG. 13 and FIG. 14.

For example, the first switching element SW31 and the second switching element SW32 of the touch screen display apparatus may be formed to have relatively large sizes of the switching elements, and the electrodes of the sensing capacitor and the reference capacitor may be formed to have relatively large sizes of the sensing capacitors. Therefore, a sensing characteristic may be improved.

Figure 21:
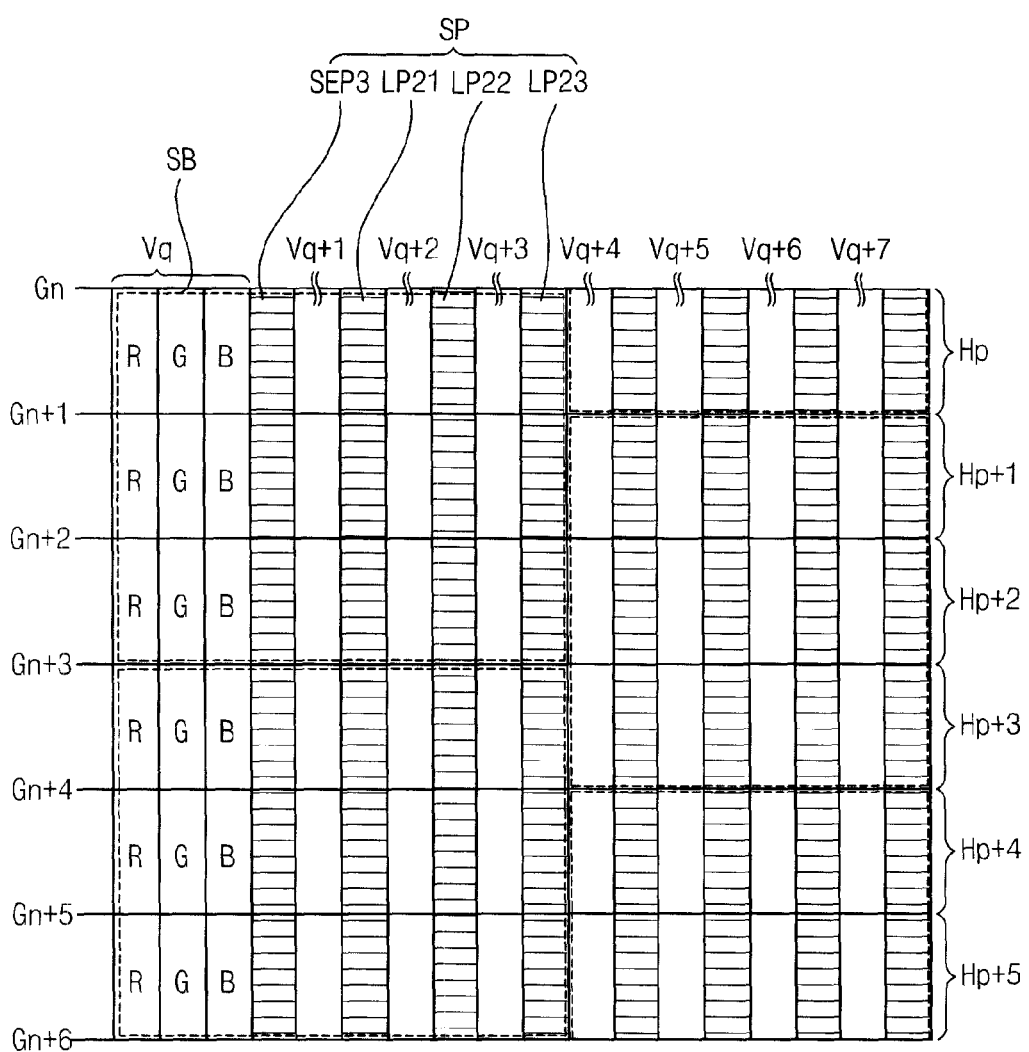
FIG. 21 is a plan view illustrating an arrangement of areas of the sensing portion of the touch screen display apparatus of FIG. 15.

FIG. 21 is a plan view illustrating an arrangement of areas of the sensing portion of the touch screen display apparatus of FIG. 15.

In case of executing a multi gate line driving to increase a sensing sensitivity, the waveform diagrams of gate signals applied to the touch screen display apparatus of FIG. 21 may be substantially the same as the waveform diagrams in FIG. 14. Therefore, the waveform diagrams may be omitted in order to avoid unnecessarily obscuring the invention.

Referring to FIG. 14, FIG. 15 and FIG. 21, the touch screen display apparatus may include a plurality of pixel portions and a plurality of sensing portions SP.

The pixel portions may include a plurality of horizontal lines Hp, Hp+1, Hp+2, Hp+3, Hp+4 and Hp+5 and a plurality of vertical lines Vq, Vq+1, Vq+2, Vq+3, Vq+4, Vq+5, Vq+6 and Vq+7.

The sensing element portion SEP3, the first line portion LP21, the second line portion LP22 and the third line portion LP23, which are included in each of the sensing portions SP, may alternately be disposed between the adjacent vertical lines.

As illustrated in FIG. 14, FIG. 15 and FIG. 21, in case of defining a sensing block SB of 4×3 matrix structure, each sensing block SB may be arranged side by side in the second direction, and may be dislocated by one horizontal line in the first direction.

In some examples, the touch display substrate may include the sensing blocks SB of 4×3 matrix structure so that three times of a pulse width PW of gate signals applied to the gate lines Gn, Gn+1, Gn+2, Gn+3, Gn+4, Gn+5 and Gn+6 may be a distance RED2 between rising edges of the pulses. Due to the distance RED2 between the rising edges of the pulses of the gate signals, the sensing blocks corresponding to the same vertical line may be detected at the same time, and a coupling between different gate lines may be prevented.

Figure 22:
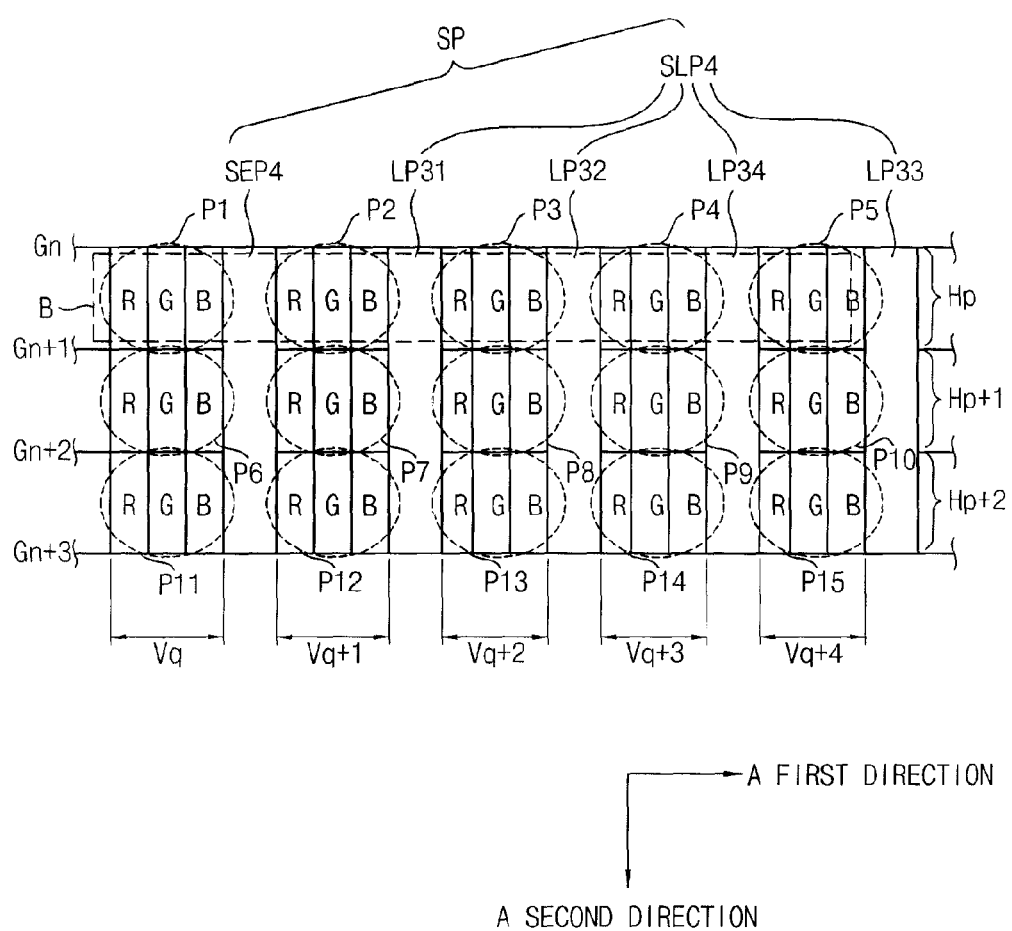
FIG. 22 is a plan view illustrating a touch screen display apparatus according to exemplary embodiments of the present invention.
Figure 23:
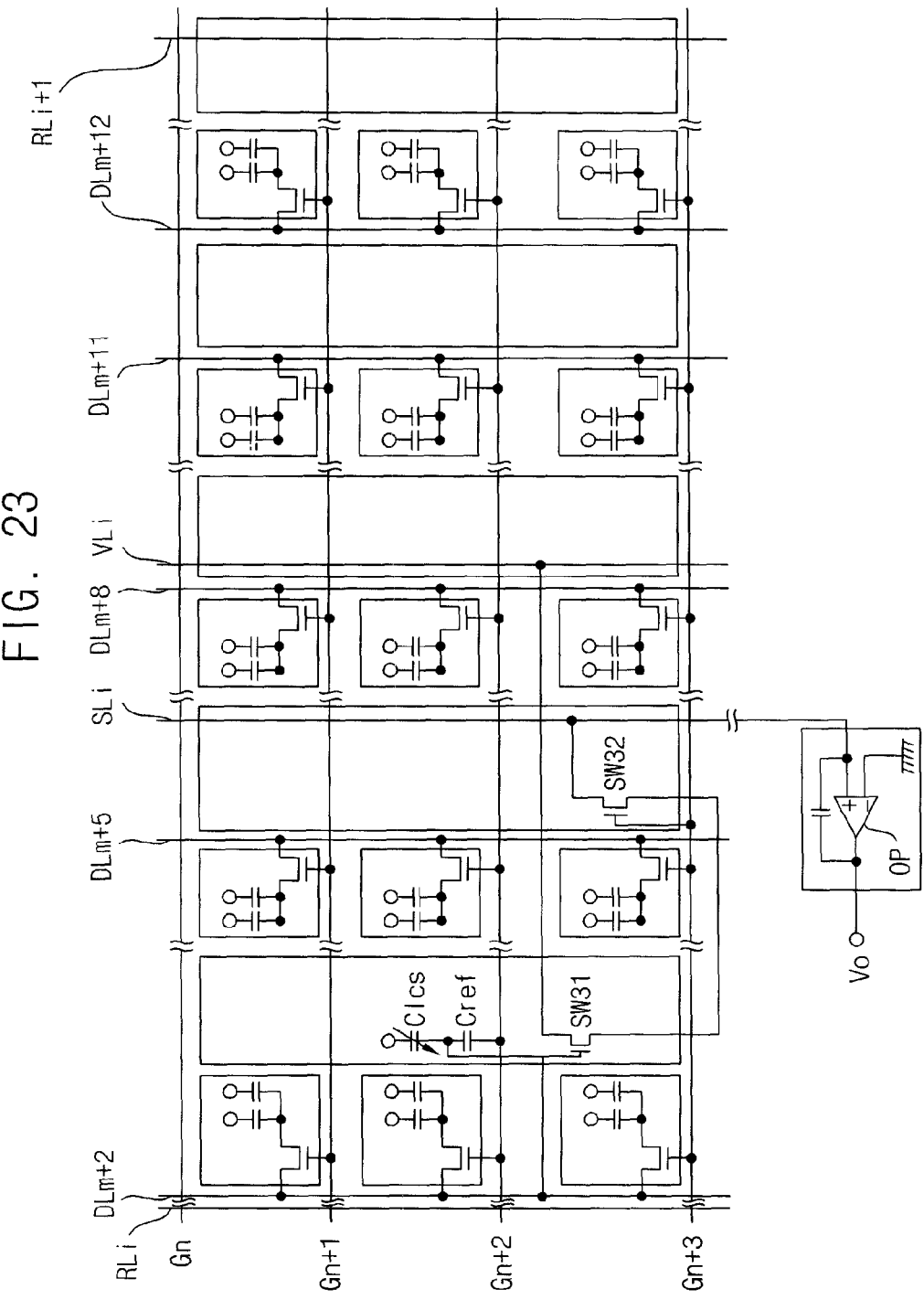
FIG. 23 is a circuit diagram illustrating a pixel portion and a sensing portion of the touch screen display apparatus of FIG. 22.

FIG. 22 is a plan view illustrating a touch screen display apparatus according to exemplary embodiments of the present invention. FIG. 23 is a circuit diagram illustrating a pixel portion and a sensing portion of the touch screen display apparatus of FIG. 22.

The touch screen display apparatus may be substantially the same as the touch screen display apparatus according to the previous example embodiment in FIG. 15, FIG. 16, FIG. 17, FIG. 18, FIG. 19, FIG. 20 and FIG. 21 except that a sensing line portion SLP4 further includes a dummy line portion LP34. Therefore, the same reference numerals may be used to refer to the same or like parts as those described in the previous example embodiment in FIG. 15, FIG. 16, FIG. 17, FIG. 18, FIG. 19, FIG. 20 and FIG. 21 and any further redundant explanation concerning the above elements may be omitted in order to avoid unnecessarily obscuring the invention.

A plan view and a cross-sectional view explaining a connection between a sensing element portion and the sensing line portion may substantially be the same as the plan view in FIG. 17 and the cross-sectional view in FIG. 18. Therefore, the plan view and the cross-sectional view may be omitted in order to avoid unnecessarily obscuring the invention.

A first pixel portion P1, a second pixel portion P2, a third pixel portion P3, a fourth pixel portion P4, a fifth pixel portion P5, a sixth pixel portion P6, a seventh pixel portion P7, a eight pixel portion P8, a ninth pixel portion P9, a tenth pixel portion P10, a eleventh pixel portion P11, a twelfth pixel portion P12, a thirteenth pixel portion P13, a fourteenth pixel portion P14 and a fifteenth pixel portion P15 are illustrated in FIG. 22. The touch display substrate may include a plurality of gate lines Gn, Gn+1, Gn+2 and Gn+3, a plurality of data lines DLm+2, DLm+5, DLm+8., DLm+11 and DLm+12.

Referring to FIG. 15, FIG. 22 and FIG. 23, the sensing portion SP may include a sensing element portion SEP4 sensing a touch and the sensing line portion SLP4. The sensing line portion SLP4 may be divided into the first line portion LP31, the second line portion LP32, the third line portion LP33 and the dummy line portion LP34 which respectively include parts of I/O lines. The dummy line portion LP34 includes a circuit that may not be patterned.

Figure 24:
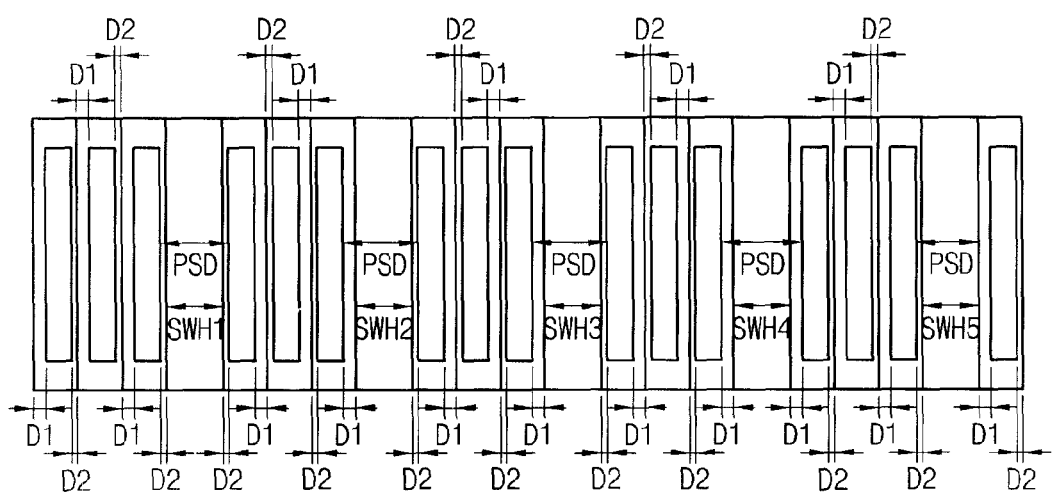
FIG. 24 is an enlarged plan view illustrating a portion 'B' of the touch screen display apparatus of FIG. 22.

FIG. 24 is an enlarged plan view illustrating a portion 'B' of the touch screen display apparatus of FIG. 22.

Referring to FIG. 22, FIG. 23 and FIG. 24, data lines corresponding to the first vertical line Vq and the fifth vertical line Vq+4 may be formed at a left side of pixel portions of the first and fifth vertical lines Vq and Vq+4, and data lines corresponding to the second to fourth vertical lines Vq+1, Vq+2 and Vq+3 may be formed at a right side of pixel portions of the second to fourth vertical lines Vq+1, Vq+2 and Vq+3. Therefore, a pixel separation distance PSD including the two data lines and a width of the dummy line portion LP34 may decrease due to the dummy line portion PL34 where data lines may be disposed closely and a metal layer may not be patterned so that an aperture ratio of the touch screen display apparatus may be enhanced to be about 44%.

A plan view illustrating an arrangement of areas included in the sensing portion of the touch screen display apparatus of FIG. 22 and waveform diagrams illustrating gate signals applied to the touch screen display apparatus in FIG. 22 may be substantially the same as FIG. 21 and FIG. 14 except that a sensing block is a 5×3 matrix structure. Therefore, the plan view and waveform diagrams may be omitted in order to avoid unnecessarily obscuring the invention.

In some examples, the touch display substrate may include the sensing blocks SB of a 5×3 matrix structure, and in case of executing a multi gate line driving to increase a sensing sensitivity, three times of a pulse width PW of gate signals applied to the gate lines Gn, Gn+1, Gn+2, Gn+3, Gn+4, Gn+5 and Gn+6 may be a distance RED2 between rising edges of the pulses. Due to the distance RED2 between the rising edges of the pulses of the gate signals, the sensing blocks corresponding to the same vertical line may be detected at the same time, and a coupling between different gate lines may be prevented.

In some examples, the sensing line portion coupled to the sensing element portion, which is disposed between the pixel columns to detect a touch event, may be disposed between pixel columns different from pixel columns where the sensing element portion is disposed so that an aperture ratio of a touch screen display apparatus may be enhanced. For example, a distance of pulses of gate signals applied to gate lines can be controlled so that a coupling between different gate lines may be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A substrate, comprising:
   a plurality of pixels, comprising a plurality of pixel electrodes arranged in column directions and row directions on the substrate;
   a sensing element disposed in a first column arranged between a first pixel column and a second pixel column to detect a touch event; and
   a sensing line disposed in a second column arranged between pixel columns to be coupled with the sensing element, the second column being different from the first column.

2. The substrate of claim 1, wherein the sensing element comprises:
   a reference capacitor coupled to an n-th gate line, wherein 'n' is a natural number; and
   a touch electrode coupled to the reference capacitor.

3. The substrate of claim 2, further comprising:
   a reset element disposed adjacent to the n-th gate line.

4. The substrate of claim 3, wherein the sensing element further comprises:
   a first switching element coupled to the touch electrode; and
   a second switching element coupled to a (n+1)-th gate line and the first switching element.

5. The substrate of claim 4, wherein the sensing line comprises:
   a voltage line to apply a power voltage to the first switching element;
   a reset line to apply a reset voltage to the reset element; and
   a sensing signal line to output a sensing signal, the sensing signal being generated from the second switching element.

6. The substrate of claim 5, further comprising:
   contact portions to couple the first switching element, the second switching element and the reset element to the voltage line, the sensing signal line and the reset line respectively, the contact portions being disposed between the pixel rows,
   wherein the contact portions are coupled to each other via a transparent electrode intersecting the data line, the voltage line, the sensing signal line and the reset line.

7. The substrate of claim 5, wherein the sensing element and the sensing signal line are alternately disposed in a first direction.

8. The substrate of claim 3, wherein the sensing element further comprises a first switching element coupled to the touch electrode.

9. The substrate of claim 8, wherein the sensing line comprises a first line comprising a second switching element and a sensing signal line, the second switching element is coupled to a (n+1)-th gate line and the first switching element, the sensing signal line outputs a sensing signal, and the sensing signal is generated from the second switching element.

10. The substrate of claim 9, wherein the second switching element comprises a gate electrode coupled to the (n+1)-th gate line, a source electrode coupled to a drain electrode of the first switching element, and a drain electrode coupled to the sensing signal line, and
    the source electrode and drain electrode are bar-shaped electrodes.

11. The substrate of claim 9, wherein the sensing line further comprises a second line comprising a voltage line and a reset line, wherein the voltage line applies a power voltage to the first switching element, and the reset line applies a reset voltage to the reset element.

12. The substrate of claim 11, wherein the sensing element, the first line and the second line are sequentially disposed in the row direction.

13. The substrate of claim 9, wherein the sensing line portion comprises:
    a second line comprising a voltage line to apply a power voltage to the first switching element; and
    a third line comprising a reset line to apply a reset voltage to the reset element.

14. The substrate of claim 13, wherein the sensing element, the first line, the second line and the third line are sequentially disposed in a first direction.

15. The substrate of claim 13, wherein two data lines are disposed between pixel columns adjacent to the second line, and one data line is disposed between pixel columns adjacent to the first line, and one data line is disposed between pixel columns adjacent to the third line.

16. The substrate of claim 13, wherein a data line is disposed at a first side or a second side of the pixel columns.

17. The substrate of claim 13, further comprising:
    a dummy line,
    wherein the sensing element, the first line, the second line, the dummy line and the third line are sequentially disposed in a first direction.

18. The substrate of claim 16, wherein two data lines are disposed between pixel columns adjacent to the dummy line, one data line is disposed between pixel columns adjacent to the first line, one data line is disposed between pixel columns adjacent to the second line, and one data line is disposed between pixel columns adjacent to the third line.

19. An apparatus, comprising:
a touch display substrate comprising a first substrate, a plurality of pixels arranged in pixel column directions and pixel row directions based on the substrate and comprising a pixel electrode, a sensing element disposed in a first column arranged between a first pixel column and a second pixel column to detect a touch signal, and a sensing line disposed in a second column arranged between pixel columns, the sensing line being coupled to the sensing element, the second column being different from the first column;
a second substrate facing the first substrate;
a liquid crystal layer disposed between the first substrate and the second substrate; and
a readout part coupled to the sensing line to receive the touch signal, and to output a readout signal in response to the touch signal.

20. The apparatus of claim 19, wherein sensing elements are disposed adjacent to each other in the first direction to be spaced apart from each other by a first distance that is equal to a width of pixel in a second direction, and the sensing line comprises an input/output (I/O) line.

21. The apparatus of claim 20, further comprising:
a gate driving part to apply a gate signal to a gate line disposed on the display substrate,
wherein a distance between rising edges of pulses of the gate signal is substantially the same as a multiplication of the number of the pixels in the pixel column corresponding to each of the sensing elements and a width of the pulses.

22. A method, comprising:
disposing a sensing portion comprising a sensing element and a sensing line, the sensing line coupled to the sensing element, wherein the sensing line is disposed between pixel columns which are different from the pixel columns between which the sensing element is disposed, wherein a plurality of pixels comprising pixel electrodes are arranged in column directions and row directions on a substrate.

23. A display capable of detecting a touch event, the display comprising:
a plurality of pixels are arranged in column directions and row directions on a substrate, wherein a sensing portion comprises a sensing element and a sensing line and the sensing line is disposed between pixel columns which are different from the pixel columns between which the sensing element is disposed, and wherein the sensing line is coupled to the sensing element.

* * * * *